United States Patent [19]

Munch et al.

[11] Patent Number: 5,036,275
[45] Date of Patent: Jul. 30, 1991

[54] INDUCTIVE COUPLING POSITION SENSOR METHOD AND APPARATUS HAVING PRIMARY AND SECONDARY WINDINGS PARALLEL TO EACH OTHER

[75] Inventors: Carl A. Munch, Reed City; Stephen R. W. Cooper, Tustin; Michael J. Rymut, Cadillac, all of Mich.

[73] Assignee: Nartron Corporation, Reed City, Mich.

[21] Appl. No.: 427,641

[22] Filed: Oct. 26, 1989

Related U.S. Application Data

[63] Continuation-in-part of Ser. No. 296,183, Jan. 11, 1989.

[51] Int. Cl.⁵ .................... G01B 7/14; H01F 21/02; G08C 19/06; G08C 19/12
[52] U.S. Cl. .................... 324/207.17; 324/207.22; 324/207.23; 324/207.24; 324/207; 324/25; 340/870.31; 336/45
[58] Field of Search ............... 324/207, 208, 225, 226, 324/262, 207.11, 207.15, 207.16, 207.17, 207.22, 207.23, 207.24, 207.25, 207.26; 340/870.31, 870.32, 870.33, 870.34, 870.35, 87.36; 336/30, 45, 73, 75, 77, 84 R, 130, 132, 133, 136

[56] References Cited

U.S. PATENT DOCUMENTS

| 2,911,632 | 11/1959 | Levine et al. . |
| 3,001,183 | 9/1961 | McKenney et al. . |
| 3,020,527 | 2/1962 | MacLaren . |
| 3,030,574 | 4/1962 | Nissenson . |
| 3,181,055 | 4/1965 | Bischof . |
| 3,479,582 | 11/1969 | Meyer ........................ 340/870.35 |
| 3,654,549 | 4/1972 | Maurer et al. . |
| 3,821,652 | 6/1974 | Wiebe et al. . |
| 3,890,607 | 6/1975 | Pelenc et al. . |
| 3,982,189 | 9/1976 | Brooks et al. . |
| 3,995,222 | 11/1976 | Mitarai . |
| 4,502,006 | 2/1985 | Goodwin et al. . |
| 4,658,153 | 4/1987 | Brosh et al. . |
| 4,663,589 | 5/1987 | Fiori, Jr. . |
| 4,723,446 | 2/1988 | Saito et al. ........................ 73/313 |
| 4,742,794 | 5/1988 | Hagstrom . |

FOREIGN PATENT DOCUMENTS

1232931 12/1984 U.S.S.R. ................ 324/239

OTHER PUBLICATIONS

William Brenner, "Magnetostrictive LDTs are Precise, Built Tough", *I & CS*, Sep. 1989, pp. 45–47.

*Primary Examiner*—Walter E. Snow
*Attorney, Agent, or Firm*—Watts, Hoffman, Fisher & Heinke Co.

[57] ABSTRACT

A position sensing device including two spaced conductive coils constituting a primary and secondary winding of a transformer. A coupling member is mounted to a moveable object such as an automobile steering mechanism and moves relative the primary and secondary windings. This movement adjusts or alters the transformer coupling between the primary and the secondary and produces a variable output signal which can be correlated through use of appropriate circuitry to the position of the moveable member. Two alternate designs are disclosed. In a first design, the transformer primary and secondary are disposed side-by-side and the coupling member slips over the primary and secondary for relative linear movement. In a second design, the primary and secondary are disposed one within the other and the coupling member fits within a gap between the primary and secondary.

27 Claims, 15 Drawing Sheets

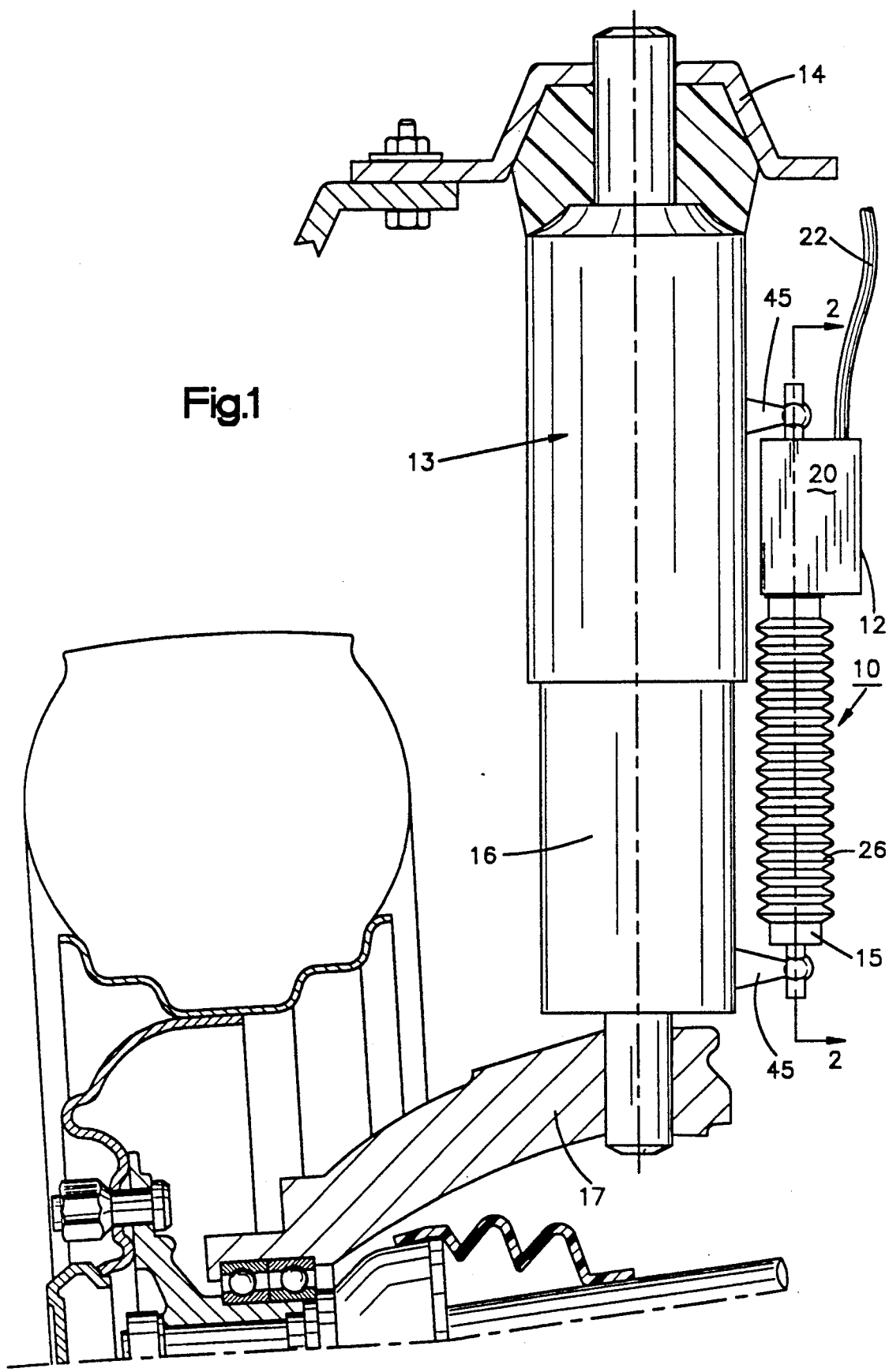

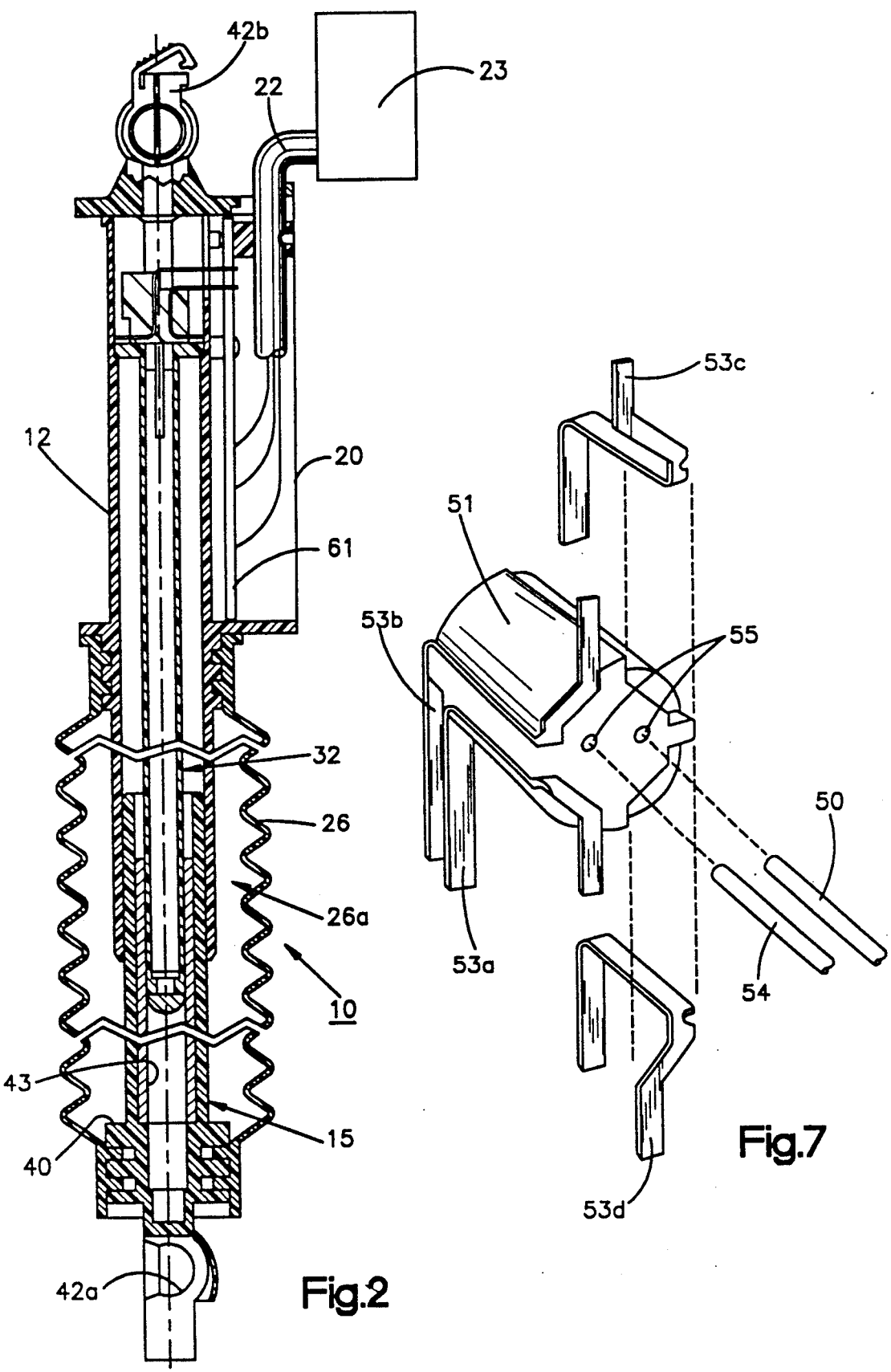

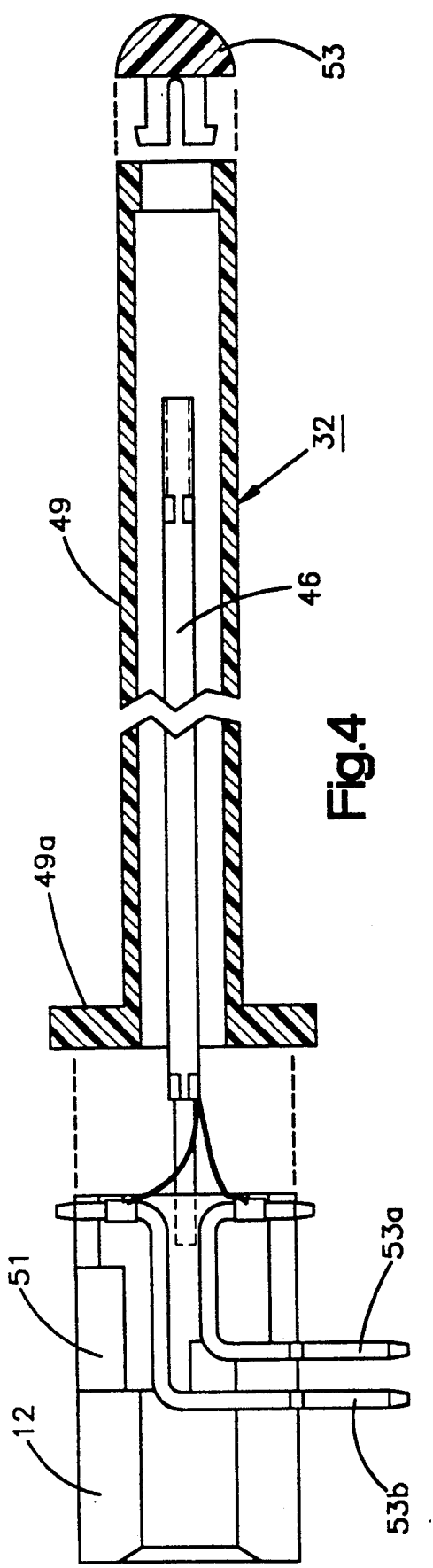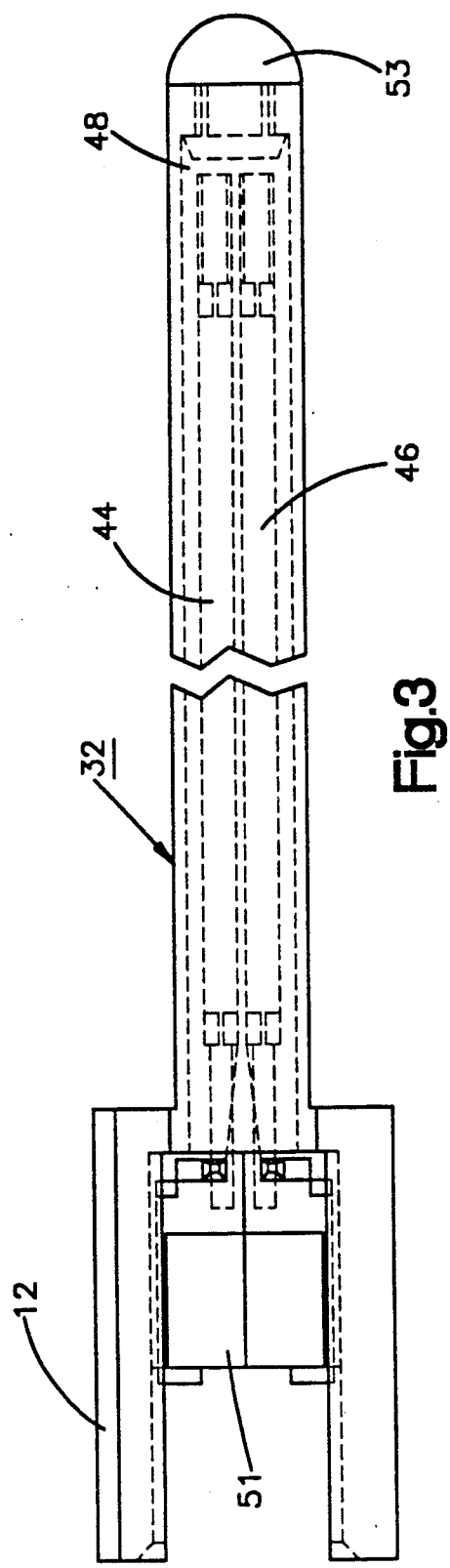

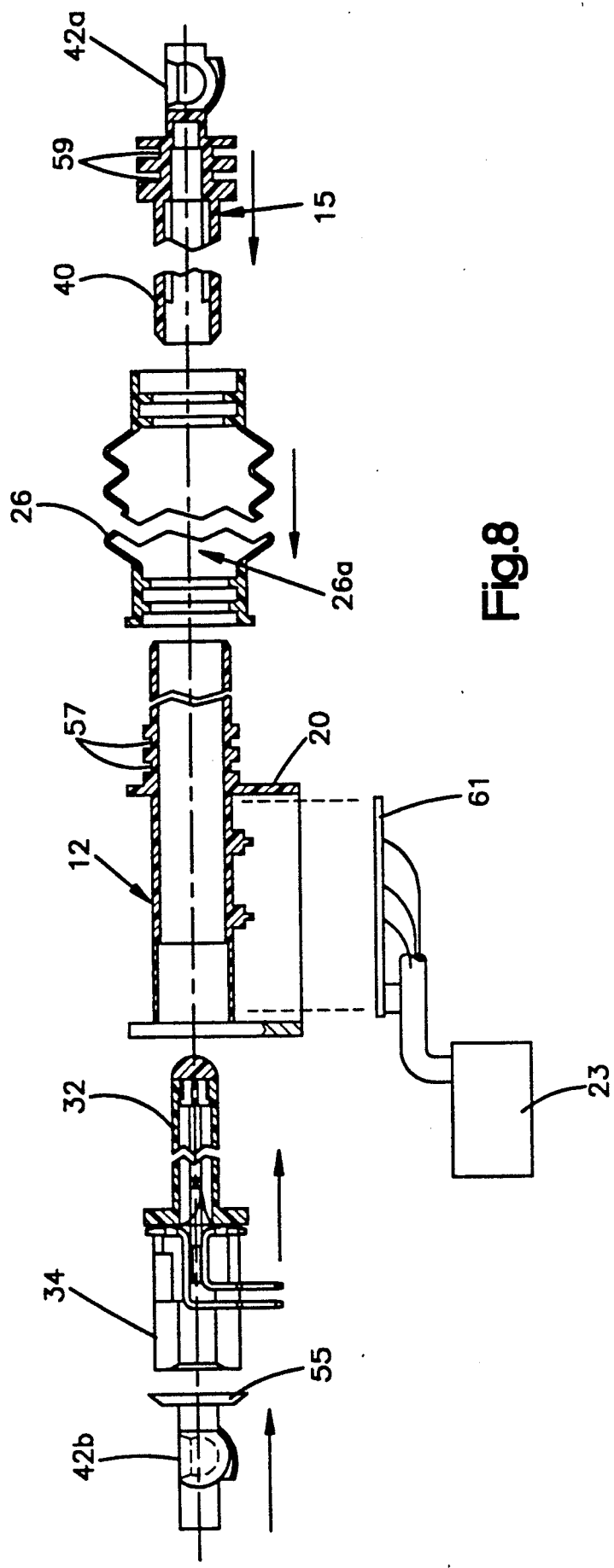

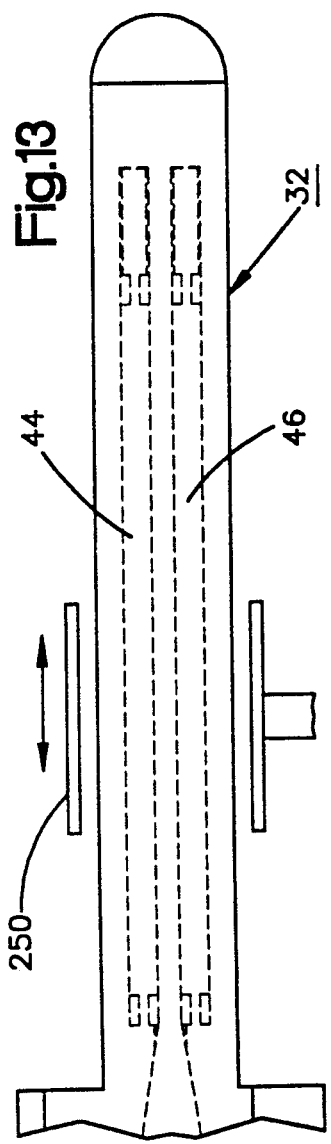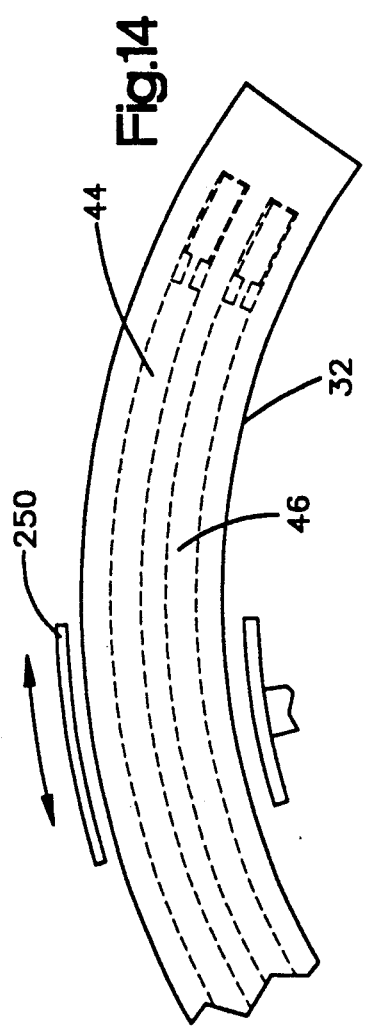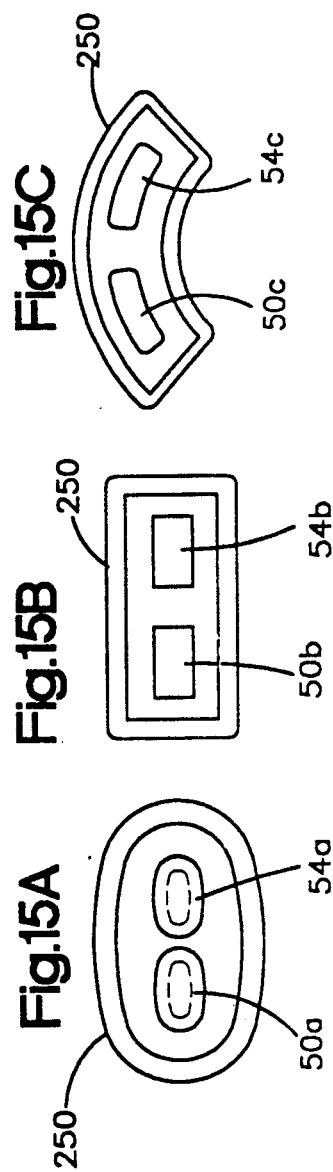

INDUCTIVE COUPLING POSITION SENSOR METHOD AND APPARATUS HAVING PRIMARY AND SECONDARY WINDINGS PARALLEL TO EACH OTHER

CROSS REFERENCE TO RELATED PATENTS

The present patent application is a continuation-in-part of Pat. application Ser. No. 296,183, filed Jan. 11, 1989, entitled "Linear Position Sensor," to Munch et al.

FIELD OF THE INVENTION

The present invention concerns a sensor that provides a signal that varies with motion (translation or rotation) according to a function such as a voltage transfer function.

BACKGROUND ART

Prior art position sensors are known which make use of a variable transformer. In simple transformer parlance an M turn primary coil with current "I" passing through the M turns induces a flux in the transformer secondary given by:

$$F1 = M*I/R \qquad (1)$$

where F1 is the magnetic flux (flux) and R is the reluctance of the magnetic path linking the primary to the secondary. When the magnetic permeability of a yoke linking the primary to the transformer secondary is sufficiently low virtually all of the flux induced by the primary will be confined in the yoke and result in the flux being approximately constant throughout the transformer (i.e. magnetic circuit of the transformer). This allows most of the flux produced in the primary (some leakage of flux from the yoke is inevitable) to also link the secondary. Often a small air gap is used to provide the bulk of the reluctance in the reluctance path (magnetic circuit) and thereby minimize effects due to variations of permeability in the yoke due to material or temperature changes. The flux "F1" induced by the primary will then induce an emf in the secondary given by:

$$V_{sec} = -f*(dF1/dt)*N$$
$$= -f*M*N/R*(dI/dt) \qquad (2)$$

where "f" is a factor representing the fraction of the flux "F1" produced in the primary that passes through the secondary and "N" is the number of turns of the secondary. The factor "f" is generally dependent on the geometry and permeabilities of the various elements in the reluctance paths linking the primary and secondary coils. In an ideal transformer f=1. Not mentioned but relevant are hysteresis effects that can effect f & R and core and wire losses that can effect the overall power efficiency of the transformers. Variations in geometry and materials to minimize hysteresis effects, inefficiencies, size, and weight are the basis for a broad range of transformer applications.

The key factors to note in the "fixed" transformer design are:

(a) The designs are optimized to minimize the flux loss "f" between the primary and secondary.

(b) In normal operation the reluctance of the flux paths (magnetic circuit) associated with the transformer remain constant.

(c) The number of turns on the primary "M" and secondary "N" remain constant.

Variable Transformers (variable secondary)

As shown in the preceding expression for the induced emf in a secondary coil in a transformer ($V_{sec}$) the induced voltage is directly proportional to the number of turns of secondary (N) linked by the flux produced by the primary coil. A common method of varying a signal with respect to motion is to build a transformer that has a mechanical tracking element which changes the effective number of turns of the secondary linked by the flux generated in the primary.

In accordance with one known technique the secondary coil acts as a tracking element and passes over the primary. In this example (provided that the current remains constant in the primary) the value of the number of turns of secondary linked by the flux from the coil changes linearly with changes in the position of the secondary.

A second type of variable transformer uses a wiper that electrically taps the secondary at the position of the wiper contact. This results in $V_{sec}$ depending only on the number of turns between the upper end of the secondary and the point of contact of the wiper. As long as the range of motion of the wiper is constrained to stay within the length of the secondary the effective number of turns "N" of secondary contributing to $V_{sec}$ is given by:

$$N' = n*x' \qquad (3)$$

where n is the turn density of the secondary and x' is the distance between the point of contact of the wiper and the upper end of the secondary.

Disadvantages of these two types of variable transformer are the necessity of having an electrical lead connected to the tracking part, wearing of the contact region between secondary and wiper (resulting in broken contact and/or interwinding shorting of the secondary), and the size and weight penalties associated with using a yoke to control the flux distribution (i.e. keep flux constant throughout the transformer).

In all the variable secondary designs accuracy can be effected by temperature effects on the reluctance of the transformer and difficulties in controlling effects near gaps, ends of windings and/or cores. Further corrective steps include adding compensating coils to the transformer and signal conditioning. In general the goal in these designs is to achieve a smoothly varying and repeatable $V_{sec}(x')$ which can then be modified in follow-on electronics to achieve the desired $V_{signal}(x)$'s.

Variable Transformer (variable reluctance)

In transformers of the variable reluctance class a tracking element changes the reluctance (R) and/or coupling efficiency (f) of the transformer as it moves. From the transformer equation (2) given earlier, it is clear that variations in "f" and/or "R" will directly effect the magnitude of $V_{sec}$.

A prior art design is known where a "gap controller," acting as a tracker, is moved in and out to change the effective size of the gap. As stated earlier, in general, the bulk of the reluctance in a transformer is kept across the gap of the transformer. As a result large variations in gap size can be expected to introduce large variations in overall transformer reluctance. Some variation in the flux leakage factor "f" can also be expected although in general "f" will be effected far less than reluctance. Applying simple magnetic circuit analysis the reluctances of the yoke, cores and gap can be expected to add in series resulting in:

$$R_t = R_y + R_{cp} + R_{cs} + R_g \quad (4)$$

where $R_t$, $R_{cp}$, $R_{cs}$, and $R_g$ are the reluctances of the transformer, yoke, primary core, secondary core, and gap, respectively. The transformer equation discussed earlier becomes:

$$V_{sec} = -f*N*M/R_t*(dI/dt) \quad (5)$$

while the action of the "gap controller" results in:

$$R_g \dashrightarrow R_g(x) ==\rightarrow R_t \dashrightarrow R_t(x), \quad (6)$$

and to a lesser extent $$f \dashrightarrow f + @(x) \text{ where } |@(x)| << |f|.$$

This yields:

$$V_{sec}(x) = -f(x)*N*M/R_t(x)*(dI/dt). \quad (7)$$

In designs of this type much effort is spent in designing the contours of the pole pieces and the "gap controller." Fringe fields in the gap can vary rapidly with changes in gap size and shape. This results in a large dependence on the contours of components in the gap. In general the goal is to achieve a smoothly varying and repeatable $V_{sec}(x)$ that may be modified in follow-on electronics to yield the desired $V_{signal}(x)$. In some cases it is possible to optimize the contours of the pole pieces and "gap controller" to the point where $V_{sec}(x)$ gives the desired $V_{signal}(x)$ directly.

Disadvantages are the sensitivity of the design to gap variations. Fields in small gaps can change rapidly with small changes in gap size or geometry. This can impose a severe tolerance constraint which makes the design extremely sensitive to motion of the gap controller perpendicular to that of the desired sense motion "x". This is complicated by the fact that a "gap controller" will be strongly attracted to the pole pieces in the gap. Eliminating motion perpendicular to "x" then involves a mounting system that is secure enough to withstand the tractive forces between "gap controller" and pole pieces in the gap in addition to any shock forces present due to vibration or stress on the system.

A clear advantage over the "variable secondary" designs results, however, from not having any electrical leads to the tracking component (gap controller) which can fatigue or work loose.

A slightly different use of a "gap controller" acts to increase or decrease the reluctance of a shunt path which acts analogously to a short in an electric circuit. As the reluctance of the "shunt gap" is decreased below that of the "secondary gap" the flux induced by the primary will preferentially follow the shunt path as opposed to the secondary path. In this case the flux leakage parameter "f" is strongly effected as the "shunt" path is essentially a form of leakage path. The reluctance of the secondary path "$R_s$" can also be expected to be effected but far less strongly than is "f" which is the opposite of the effect seen in the "variable reluctance" transformer.

As in the "variable reluctance" transformer much effort is spent in optimization of the contours and materials of the pole pieces and gap controller. The disadvantages are dominated by tight tolerance requirements of the components in the controlled gap and are the same as those discussed for the "variable reluctance" transformer. In both of these types of transformer the contoured pole and controller pieces combined with tight tolerance requirements often imply high cost.

Linear Variable Differential Transformers (LVDT)

In transformers of this kind the output is differential and represents the signal balance between two secondaries acted on by a single primary. LVDT's are extremely popular. Applications include acoustic, motion, and seismic sensing. A high profile application is seismic sensing for oil exploration.

The LVDT transformer has a core which moves and acts as a tracking element. The two secondaries are coupled by the primary. The relative orientation of primary and secondaries remains fixed at all times. As the core moves the region of the primary covering the core moves with it. Except for fringe effects near the ends of the core only the region of the primary covering the core will have any appreciable flux. In the central region of the core (in from the ends) the flux induced by the primary is essentially constant so that the relative balance of flux linking the two secondaries (save for end effects) is directly proportional to the number of turns of each of the two secondaries that cover the region of the primary filled by the core. As long as the core is constrained to move so that the two ends of the core are kept entirely within the secondaries and within the primary the fringe effects from the core ends can be expected to cancel and can be largely neglected. The behavior of this device can be characterized as follows. The flux in the central region of the core will be given approximately by:

$$F1 = -M/R*(dI/dt) \quad (8)$$

where M is the number of turns on the primary and R is an effective reluctance path seen near the central region of the core. The flux variation near the ends is in general difficult to characterize and will simply be represented as:

$$F_a = f(I, x') \text{ and}$$
$$F_b = f(I, x') \quad (9)$$

where x' is the absolute value of the distance from the center of the core and f(I,x') represents the flux variation near the ends of the cores. The induced emf in the secondaries is then given by:

$$V_{seca}(x) = V_a - [-f*M*N*x/R*(dI/dt)] \text{ and}$$
$$V_{secb}(x) = V_b + [-f*M*N*x/R*(dI/dt)]. \quad (10)$$

where n is the turn density in the secondaries, x is the position of a reference point on the core (but in from the ends of the core) relative to the boundary between the two secondaries, $V_a$ and $V_b$ are the values of $V_{seca}(0)$ and $V_{secb}(0)$ respectively. $V_a$ and $V_b$ each contain equal contributions from the integral of f(I,x') over the region of the core end that is in each secondary. The differential signal then becomes:

$$V_{diff} = V_{seca}(x) - V_{secb}(x) \tag{11}$$
$$= V_a - V_b + 2*f*M*N*x/R*(dI/dt)$$

It is important to note that $V_a$ and $V_b$ are constants with respect to x which results in $V_{diff}$ being linear in x.

Accuracies of < 100 nm are possible along with very high degrees of linearity. These factors combined with no electrical leads to the tracking element and the inherent temperature compensation and noise rejection of a differential output account for much of the popularity of these sensors.

Disadvantages include the comparatively limited travel of the core with respect to overall device size (due to the need to keep the ends of the core away from the boundary region between the secondaries) and a need for phase detection to determine the sign of "x". Additionally, these devices are optimized for accuracy and tend to be expensive (>$100) in terms of automotive applications where sensor accuracies and target prices are generally lower (Accuracies greater than 100 nm & costs of less than $10).

Disclosure of the Invention

The present invention concerns a position sensing method and apparatus that is accurate, yet relatively inexpensive to build and has a variety of applications and configurations all suitable for monitoring the position, velocity, or acceleration of a moveable member.

Position sensing apparatus constructed in accordance with the invention includes an elongated field producing member having an input for energizing the field producing member to produce an electromagnetic field in the vicinity of the field producing member. An elongated field responsive member is fixed with respect to the field producing member and oriented in a generally parallel orientation to the field producing member along the length of the field producing member. The elongated field responsive member has an output for providing an output signal in response to an electromagnetic field produced by the field producing member.

A coupler connected to the moveable member whose movement is to be monitored moves with the moveable member relative to the field producing and field responsive members. The coupler alters the response of the field responsive member as the moveable member moves and thereby changes the signal at the output of the field responsive member. An exciter circuit is coupled to the input of the field producing member for energizing the field producing member and a circuit is coupled to the output from the field responsive member to correlate changes in the output signal with movement of the moveable member.

In accordance with a preferred embodiment of the invention, the elongated field producing and field responsive members are each constructed from multiple turn, current carrying conductors wound around center axes that extend linearly in the same direction. When energized, current passes along the multiple turn current carrying coil of the field producing member to induce a current in the multiple turn coil of the field responsive member. The preferred design allows high accuracy along a long linear tracking range (note: a curved tracking path is also possible) with no electrical contacts between the coupler and other elements of the system. This design results in a simple geometry and relatively simple exciter and monitoring circuits for correlating changes in output signal from the field responsive member with movement of the moveable member.

In one embodiment, the field producing member has a coil turn density of $N_p(x)$ (x is a coordinate in the direction of movement of the moveable member and when the member moves along a linear path corresponds to one of an orthogonal coordinate system) wrapped on a magnetically permeable core. The permeability of the core may or may not be manipulated to vary according to a desired "P(x)" vs "x" relationship where P(x) is the permeability along the core. Choice of $N_p(x)$ and core material(s) will vary with desired output signal transfer characteristic $V_{out}(x)$ and temperature response requirements. In a presently preferred embodiment of the invention $N_p(x)$ is a constant. The function of the field producing member is the same as that of the primary in a transformer device, i.e., to produce magnetic flux.

A fixed position field responsive member has a turn density of $N_s(x)$ wrapped on a magnetically permeable core. The permeability of the core (through material choices) may be manipulated to vary according to a desired "P(x)" vs "x" relationship where P(x) is the permeability along the core.

The field responsive member is placed parallel and immediately next to the field producing member. In one embodiment of the invention the field producing and field responsive members are located one within the other and in a second embodiment they extend side by side. Choice of $N_s(x)$ and core material will vary with desired transfer characteristic $V_{out}(x)$ and temperature responsive requirements. In the present configurations $N_s(x)$ has been configured to achieve a linear "$V_{out}(x)$" vs "x" relationship. In fact a broad range of linear and nonlinear relationships are possible by merely adjusting $N_s(x)$ as well as $N_p(x)$ without changing the device geometry.

A preferred coupling member is formed from a shorted tracking "coil" placed over the side by side field producing/field responsive members and interposed between the gap between those members in the alternate embodiment. The coupling member moves relative to the field producing and field responsive members and has no electrical connections exterior to itself. The choice of $N_c(x)$ (coupler coil winding density) will vary with desired transfer characteristic ($V_{out}(x)$) and temperature response requirements. In one configuration $N_c(x)=1/D$ where D is the length of the coupler. This turn density is achieved by using a metal tube as opposed to a wound coil. The metal tube (aluminum in the current preferred configuration) offers ease of fabrication advantages over a multiturn coil without unacceptable losses in device performance. (Note that the tube acting as a single turn coil or on which a coil is wound may or may not be magnetically permeable with a "P(x)" vs "x" relationship depending on the desired system response).

The coupler coil responds to the integral of the flux passing through its length and parallel to its axis through an induced emf on the coupler coil directly proportional to the integral of that flux, i.e., $$|\text{\%51 EMF coupler}| = Ac*w*|\text{Integral}[\text{flux}(x)*N_c(x)*dx]| \tag{12}$$

where w is the angular frequency in radians/second (for sinusoidal excitation of the primary), x is in the direction of the axis of the coupler, Ac is a constant and the integral is performed throughout the length of the coupler. The induced emf then results in a current in the coupler coil which in turn induces magnetic flux in the field producing and field responsive members that is proportional to that current. This induced flux from the coupler results in emf's on both the field producing and field responsive members. On the field producing member the emf from the coupler is seen as additional load while on the field responsive member the induced emf is seen as $V_{sec}(x)$.

Different embodiments of the invention are described for a vehicle ride control system that must operate in the harsh environment of the underside of a vehicle chassis. This use of the invention includes one configuration where one portion of a position senor probe includes primary and secondary winding that are parallel and spaced apart. A coupling member is positioned around both coils, such that the signal developed in the secondary coil increases as the coupling member overlies more of the primary and secondary windings. In another embodiment of the use of the invention, the primary and secondary windings are positioned one within the other and separated apart by a cavity or gap. The coupling member is positioned between the windings in the gap such that the presence of the coupling adjustment means decreases the transformer coupling between the winding, which causes the signal developed across the secondary winding to decrease as the coupling member extends further into the gap between the windings.

BRIEF DESCRIPTION OF THE DRAWINGS

FIG. 1 is a side view of a non-contact position sensor coupled to a vehicle shock absorber;

FIG. 2 is an enlarged sectional view of the position sensor as seen from the plane defined by the line 2—2 in FIG. 1;

FIG. 3 is a plan view of a winding assembly that forms a part position sensor;

FIG. 4 is a partially sectioned, exploded side view of the assembly;

FIG. 7 is a perspective view of a carrier that supports terminals for routing signals to and from the winding assembly of FIG. 3;

FIG. 8 is an exploded, partially sectional view of a housing that supports the winding assembly;

FIG. 13 is a schematic depiction of a winding assembly and coupling member that extends only a short distance along the winding assembly;

FIG. 14 is a schematic depiction of an arcuate winding assembly coupling member that moves along an arcuate path;

FIGS. 15A-15C depict alternate cross sectional configurations for the winding assembly and the coupling member;

DESCRIPTION OF THE PREFERRED EMBODIMENT

Figure 5:
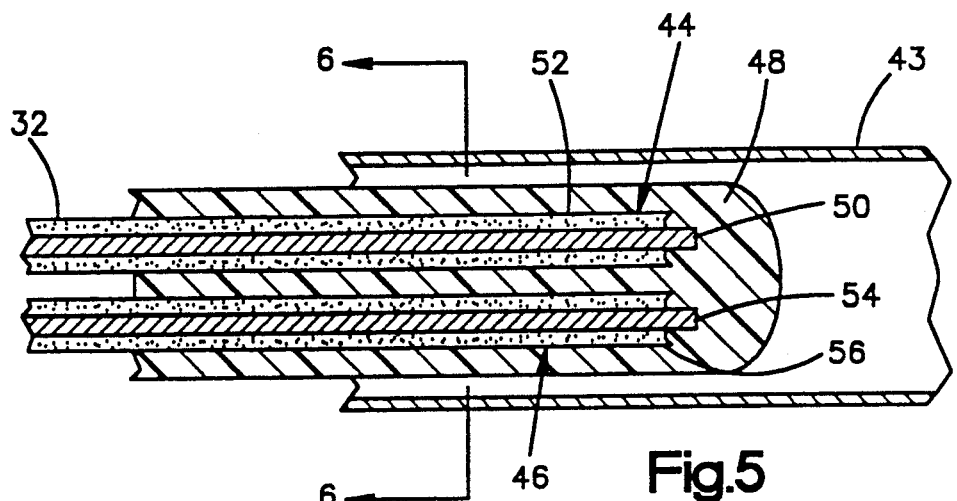
FIG. 5 is an enlarged sectional view of a distal end of alternate winding assembly.

Referring now to the drawings, and the illustrative embodiments depicted therein, a non-contact position sensor 10 includes a base portion 12 attached to one portion of a vehicle, such as the portion of a shock absorber 13 attached to the vehicle chassis 14, and a tracking portion 15 which is attached to a portion of the vehicle whose position it is desired to sense, such as the portion 16 of the shock absorber attached to a wheel support assembly 17 (FIG. 1). The base and tracking portions 12, 15 are relatively longitudinally movable with respect to each other and are external to the shock absorber 13.

The position sensor 10 further includes a housing 20 that supports circuitry for generating position indicating signals and transmitting those signals via a cable 22 to a vehicle ride control computer. In a preferred design an electrical connector 23 (FIG. 2) attached to the cable 22 is adapted to engage a mating connector (not shown) for connection to a ride control computer and provides input and output interconnection for the position sensor 10.

A flexible cylindrical bellows 26 is coupled at one end to the base portion and at an opposite end to the tracking portion of the sensor 10 and defines an internal chamber 26a (FIG. 2). A winding assembly 32 extends from the base portion 12 into a region surrounded by the bellows 26. The winding assembly 32 includes a proximal end portion 34 fixed to the sensor base portion 12 and a distal sensing portion 36 positioned within the bellows 26.

The tracking portion 15 includes a support 40 for a transformer coupling member that includes an elongated tubular conductor 43. The tubular conductor 43 has an inner diameter selected to freely slide over an outer diameter of the winding assembly 32. The support 40 includes a fitting 42a for attachment of the tracking portion 15 of the sensor to a mounting stud 45 of the shock absorber. A similarly constructed fitting 42b at the base portion 12 of the sensor 10 allows the sensor 10 to be attached to a second mounting stud 45 attached to the shock absorber.

The winding assembly 32 includes a primary winding 44 and a secondary winding 46 that are mutually suspended in a material 48 within a plastic casing 49. This material 48 acts to damper shock and vibration. The primary and secondary windings 44, 46 are aligned side-by-side, for substantially their entire length and are generally mutually parallel and spaced apart. The primary winding 44 includes an elongated cylindrical core 50 and a coil 52 defined by a single magnet wire spirally wound around the core 50 over substantially the entire length of the core. The secondary winding 46 includes an elongated cylindrical core 54 having a coil 56 defined by a single magnet wire spirally wound around core 54 over substantially its entire length.

The FIG. 1 embodiment is preferably constructed using 0.05 inch diameter ferromagnetic steel alloy 45A (for the primary), 4140 (for the secondary) welding rods. These rods are preferably insulated 0.002 epoxy coating. Their lengths are 4.935 inch. The coils use 36 gauge solderable polyester coated, magnet wire covered by a protective film varnish Dolph AC43.

The proximal end 34 of the winding assembly 32 for includes a plastic carrier 51 (FIG. 7) that carries metal terminals 53a-53d for routing energization signals to the primary winding 44 and output signals from the secondary winding 46. The carrier 51 is constructed from plastic (preferably 30% glass reinforced polyester) and is molded to form right and left carrier halves. Each half defines an opening 55 into which the cylindrical cores 50, 54 are pressfit. The wire coils 52, 56 are then wound around the cores 50, 54 and attached to their respective terminals before the insulator such as a mylar sleeve is slipped over the coils. The two halves of the carrier 51 are then attached together and the cores 50, 54 are suspended in the suspension material 48. To suspend the windings 44, 46 the cylindrical sheath 49 is filled with the suspension material by pouring the material into an inner cavity of the sheath 49. An end cap or plug 53 is pressed into a distal end of the sheath 49. The completed winding assembly 32 is then pushed into the base portion 12 of the sensor until the carrier 51 seats within a cavity 12a in the base portion 12. A plastic cover that includes the fitting 42b is then connected to the base portion 12 to fix the winding assembly 32 in place.

The bellows 26 engages similarly configured circular slots or grooves 57, 59 defined by the base and tracking portions 12, 15 respectively and inhibits dirt and the like from entering the sliding interface between the support 40 and the base portion 12. During installation the tracking portion 15 is attached to the shock absorber via the fitting 42a and stud connection. The bellows 26 is attached to the tracking portion 15 and the base portion so the winding assembly 32 fits within the conductor 43. The base portion 12 is then attached to the stud 45 via the fitting 42b and the bellows attached to the base portion by pushing the bellows over the base portion 12 until ridges of the bellows seat in the grooves 57.

When the sensor 10 is installed the tubular conductor 43 surrounds a varying length of the coextensive, spaced, parallel primary and secondary windings 44, 46 and provides a transformer coupling adjustment member for the windings, which are configured as a transformer. In the embodiment illustrated in FIGS. 1-4, the tubular conductor 43 is a transformer coupling enhancing member which increases the transformer coupling between the primary and secondary windings as the primary and secondary windings and tubular conductor 43 become more telescopingly coextensive, as a result of movement of the vehicle wheel assembly 17 closer to the vehicle frame 14.

In the illustrated embodiment, the tubular conductor 43 is a nonferrous metal, such as aluminum, which enhances transformer coupling between the primary and secondary windings 44, 46 through a looping current that is developed in the tubular conductor 43 as a result of excitation of the primary winding 44.

Figure 9:
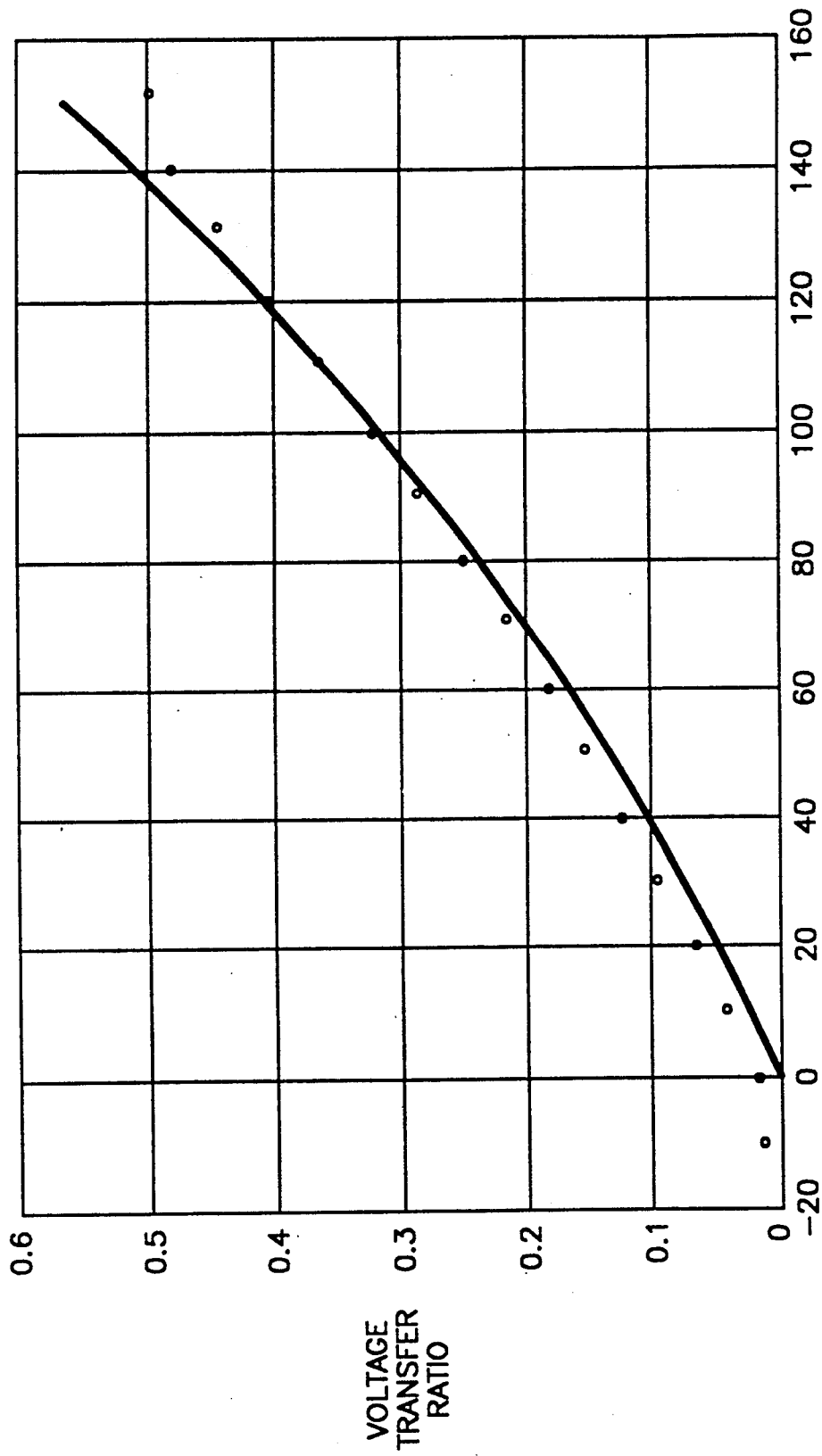
FIG. 9 is a graphic diagram of the voltage transfer ratio as it relates to the relative position of portions of a sensor probe according to the embodiment in FIG. 1.

Sample results obtained from uniformly wound primary and secondary coils are illustrated in FIG. 9 By reference to this figure, it is seen that the signal developed across the secondary winding, which is directly proportional to the voltage transfer ratio, is substantially linearly related to the amount of overlap of the tubular conductor 43 with respect to the sensing or distal portion of the winding assembly 32.

An important feature of the present invention is that the spirally wound coils may be wound with a preestablished non-constant turn spacing, by a commercially available numerically controlled winding apparatus, in a manner that may substantially cancel any remaining nonlinearity and is within the capabilities of one skilled in the art. Alternatively, it may be desired to provide a particular characteristic nonlinear voltage transfer ratio for a particular application. The turn density may be arranged in order to "tune" the voltage transfer ratio to the desired characteristic.

In an alternate embodiment of the winding assembly (FIGS. 5 and 6) the suspension material is eliminated and the shell material 48 is extended to secure and provide structural stability to the winding assembly.

Figure 6:
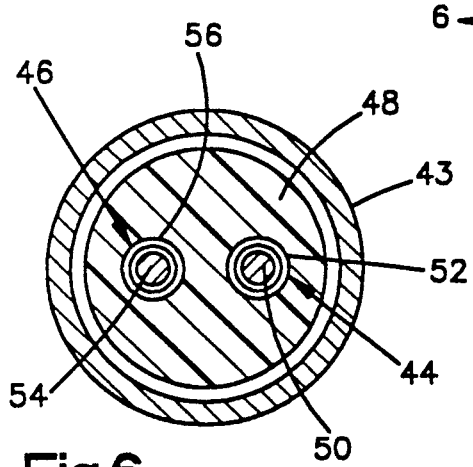
FIG. 6 is a section view as seen from the plane 6—6 of FIG. 5.

The FIG. 5 and 6 embodiment has cores 50 and 54 that are 0.05-inch diameter ferromagnetic rods insulated with a 0.002-inch Teflon coating or other insulating material and are 7.2 inches in length. Coils 52 and 56 include a double layer of 41-AWG and 43-AWG wire, respectively, compactly wound on the associated insulated core which produces an inductance of 3 to 4 milihenries for each coil. Primary and secondary windings 44 and 46 are each covered by a protective film such as a Mylar sleeve (not shown), and are mutually encapsulated by an appropriate material 48 which, in the illustrated embodiment is a liquid crystal polymer, such as Celanese Corporation Vectra B-130.

Figure 10:
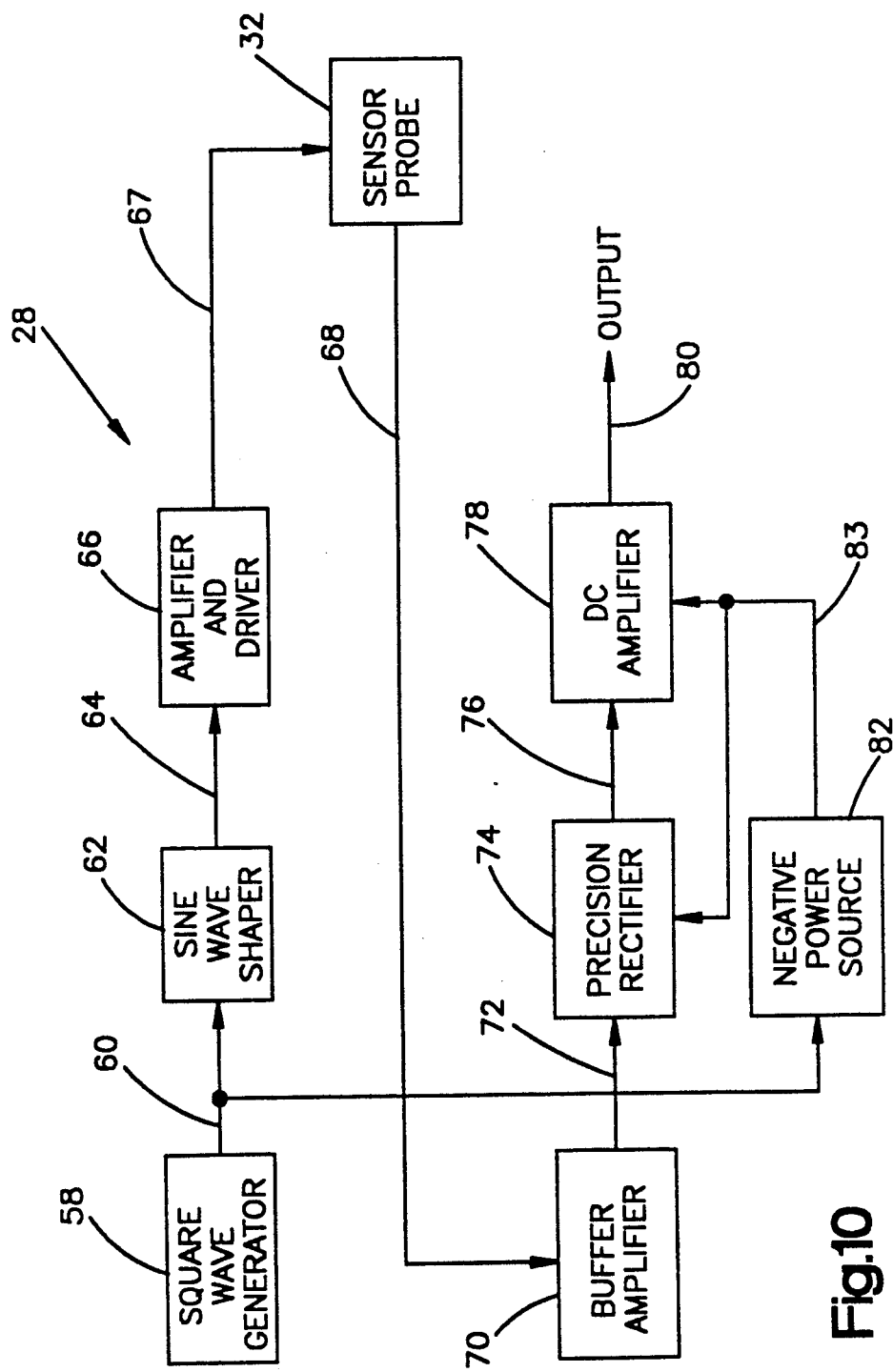
FIG. 10 is an electrical circuit diagram in block form of the electrical control circuit of the invention.

With reference to FIG. 10, organization of a control circuit mounted to a printed circuit board 61 carried by the housing 20 will be described. A square wave generator 58 produces a square wave signal on its output line 60. The square wave signal, which operates at 12.8 KHz in the illustrated embodiment, is provided as an input to a sine wave shaper circuit 62 which converts the square wave signal to a low-harmonic distortion sine wave signal having the same frequency which is provided on its output 64. The sine wave signal is amplified by an amplifier and driver circuit 66 and provided at an output 67 to the primary winding 44 of the winding assembly 32. The sine wave signal provided to the primary winding is coupled to the secondary winding in proportion to the relative longitudinal overlap of the winding assembly 32 and the coupling member 42. The signal developed across the secondary winding is provided on an output 68 to a buffer amplifier 70, which provides a high input impedance for and amplifies the relatively small signal developed across the secondary winding. Buffer amplifier 70 additionally includes means for eliminating induced high frequency noise and any DC offset. The output 72 of the buffer amplifier is provided to a precision rectifier 74 which produces a DC analog voltage on its output 76, proportional to the average AC voltage developed across the secondary winding. The DC analog voltage is amplified by a DC amplifier 78 and provided by an output 80 as an input to a ride control computer of the vehicle (not shown).

The output 60 of the square wave generator 58 is additionally provided as an input 81 to a negative power source 82 which produces a voltage on its output 83 which is negative with respect to the vehicle chassis ground and is provided as an additional supply voltage to the precision rectifier 74 and the DC amplifier 78. The purpose of supplying these portions of the control module with a negative voltage, which is normally not available in a vehicle electrical system, in addition to the conventional positive supply voltage, is to improve the linearity of the output signal, especially at low signal levels, while allowing the DC offset of the sensor output to be adjusted to a desired level, which may be zero or even a negative voltage. Additionally, by supplying a voltage to the precision rectifier and the DC amplifier that is negative with respect to chassis ground, means are provided for detecting certain internal failures of these circuit portions by monitoring the polarity of the voltage on the output 80. If the polarity of the output becomes more negative than a predetermined level, an indication is provided to the ride control computer that the position sensor is malfunctioning.

Figure 11:
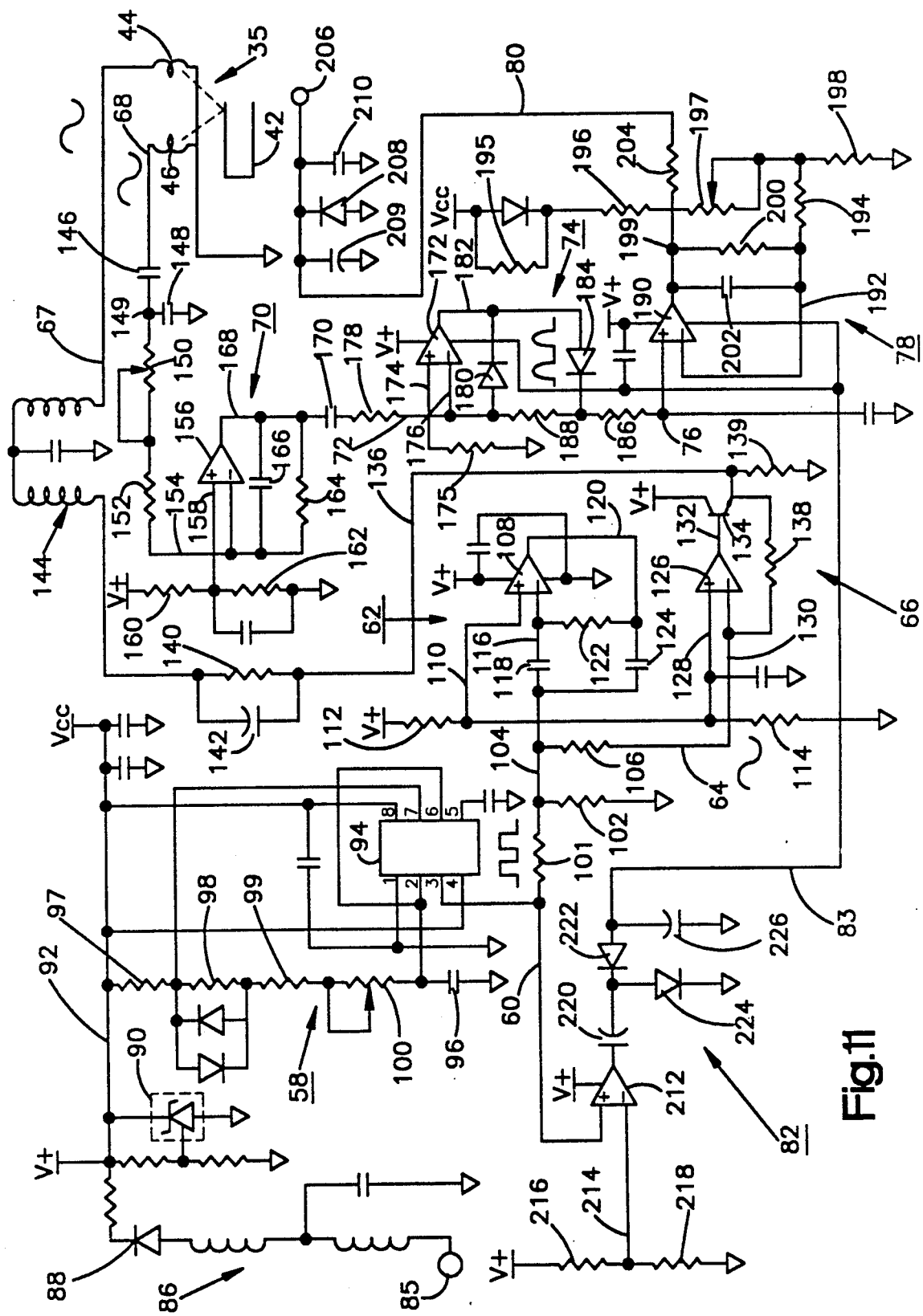
FIG. 11 is an electrical circuit diagram in schematic form of the control circuit in FIG. 10.

A detailed description of this embodiment of the electrical control system is provided by reference to FIG. 11. The vehicle supply voltage is connected through a connector to an input 85 and is conditioned by an input filter 86 and a reverse polarity protection diode 88. The conditioned supply voltage is regulated to a constant voltage VCC by a voltage regulation means 90, which may be of any such means well-known in the art and is illustrated as a programmable zener diode. The voltage VCC is produced on a bus 92 and is provided as a supply voltage to selected components in the circuit.

A square wave oscillator 58, in the illustrated embodiment, is a type 555 CMOS timer 94 having a frequency established at 12.8 KHz by a capacitor 96 connected between a timing terminal of timer 94 and signal ground and in series connection with resistors 97-100 and VCC bus 92. One of the resistors 100 is adjustable to provide factory adjustment of the frequency of timer 94. As is recognized by one skilled in the art, CMOS timer 94 provides a stable frequency and amplitude source over a wide range of temperature conditions. The output (pin 3) from timer 94 on line 60 is scaled by a pair of precision resistors 101 and 102, connected in a voltage divider arrangement, and provided on line 104.

Line 104 is provided as an input 64 to amplifier and driver circuit 66 through a resistor 106. The characteristics of the signal on line 104 are significantly altered by sine wave shaper 62 which is connected between line 104 and ground and serves as an "active load" low-pass filter to shunt the high frequency harmonics of the square wave signal to ground. This allows substantially only the low frequency component of the square wave, which is a sine wave having a frequency equal to the pulse repetition rate of the square wave generator, to pass to the primary winding 44.

Sine wave shaper 62 includes an operational amplifier 108 having a non-inverting input on line 110 held at a constant voltage provided by a voltage divider consisting of resistors 112 and 114 series connected between a positive DC power source V+ and signal ground. Amplifier 108 further includes an inverting input 116 connected with line 104 through a capacitor 118. Amplifier 108 produces an output on a line 120, which is connected with inverting input 116 through a resistor 122 and with line 104 through a capacitor 124. The particular configuration for sine wave shaper 62 causes it to actively shunt higher frequency components of the square wave to ground by the particular feedback arrangement between output line 120 and inverting input 116 including resistor 122 and capacitors 118 and 124, while providing a relatively high impedance to the base frequency of the square wave produced by timer 94 and serving to shape the signal. Accordingly, the resulting signal is a sine wave having a frequency equal to that of the pulse repetition rate of timer 94.

The sine wave signal is provided through a resistor 106 to line 64 as an input to amplifier and driver 66. Amplifier and driver 66 includes an operational amplifier 126 having a non-inverting input 128 provided with a constant voltage level from the voltage divider formed by resistors 112 and 114 and an inverting input 130 connected with input line 64 and provided with the sinusoidal signal previously described. Amplifier 126 includes an output 132 connected directly with the base terminal of a transistor 134 whose collector is connected directly with V+ and whose emitter is connected with a line 136. A feedback resistor 138 connects line 136 with inverting input 130 to establish the combined gain of amplifier 126 and transistor 134 and to cause this combination to operate as a linear amplifier. A resistor 139 between line 136 and signal ground provides a load for amplifier 126 and provides noise suppression of high frequency signals induced from external sources.

Line 136 is connected to a parallel combination of a resistor 140 and a capacitor 142. The purpose of the parallel combination is to reduce the DC component of the signal provided to the primary winding 44 while coupling the AC component of the signal to the primary winding 44. Resistor 140 may be a varistor in order to compensate for the effect of temperature variations of the DC resistance of primary winding 44. The parallel combination of capacitor 142 and resistor 140 are connected through a filter circuit 144 to one terminal of primary winding 44, the other terminal of which is connected to signal ground.

The excitation of primary winding 44, by the previously described circuitry, creates a magnetic flux which is coupled by the transformer coupling member 42 to the secondary winding 46 which will cause a signal to develop across the secondary winding. The secondary winding 46 is connected between line 68 and signal ground. Line 68 is connected to one terminal of a series capacitor 146 in order to couple only the AC components of the signal developed across secondary winding 46 to the remaining portions of the circuit. A second terminal 149 of capacitor 146 is connected to a capacitor 148 which provides a high frequency shunt to ground to reduce high frequency noise induced into the windings 44, 46. Terminal 149 is connected to the input of buffer amplifier 70 through a series combination of a gain-adjusting resistor 150 and a resistor 152.

The buffer amplifier 70 includes an amplifier 156 having an inverting input 154 to receive the signal from resistor 152. Amplifier 156 further has a non-inverting input 158 connected to a constant voltage source, provided by a voltage divider consisting of resistors 160 and 162 connected in series between V+ and signal ground in order to impart a fixed DC bias to the signal. A feedback circuit, consisting of a parallel combination of a resistor 164 and capacitor 166, is connected between output 168 of the amplifier and its inverting input 154. In this configuration, buffer amplifier 70 provides a high input impedance for the low signal level developed across the secondary winding 46 and amplifies the signal. The output of the amplifier 70 is AC coupled by a series capacitor 170 and a resistor 178 to an input 72 of the precision rectifier 74.

The precision rectifier 74 includes an operational amplifier 172 having a non-inverting input 174 connected to ground through a resistor 175. An inverting input 176 is coupled to the signal on the line 72. A diode 180 is provided as a feedback path between an output 182 and input 176 of amplifier 172 and serves to cause amplifier 172 to conduct positive going portions of the AC signal seen at the secondary of the transformer but to not conduct the negative going portions. In addition, output 182 is further connected through a forward biased diode 184 and a resistor 186 to output line 76. Diode 184 is additionally connected to inverting input 176 through a resistor 188. This configuration provides a forward voltage drop that is substantially reduced from that of a conventional rectifier by essentially dividing the forward voltage drop by the open loop gain of amplifier 172. Additionally, this configuration provides exceptional temperature stability through the use of a pair of oppositely poled diodes in the feedback loop.

Line 76 from the precision rectifier 74 is provided to DC amplifier 78, which includes an amplifier 190. Output 76 is connected to the non-inverting input of amplifier 190. An inverting input 192 of amplifier 190 is connected through a series resistor 194 to a voltage divider consisting of resistors 195, 196, 197, and 198 serially connected between VCC and signal ground. Resistor 197 is adjustable and provides means for adjusting the DC offset on the output of amplifier 190, which is provided on line 199. A parallel combination of a resistor 200 and a capacitor 202 is connected as a feedback path between output 199 and inverting input 192 and establishes the gain characteristics of amplifier 190 while providing low pass filtering characteristics to reduce AC ripple on output line 199. Output 199 of DC amplifier 78 is connected through a resistor 204 to output line 80 which is, in turn, connected to an output pin 206 of connector 23. A diode 208 between output line 80 and signal ground provides a reverse voltage clamp to eliminate excessive negative voltage swings that otherwise could be passed to the ride control computer. Additional low pass output filtering is provided by capacitors 209 and 210.

Output 60 of square wave generator 58 is additionally connected to the non-inverting input of an amplifier 212 whose inverting input 214 is maintained at a constant voltage level by a voltage divider comprising resistors 216 and 218 connected in series between VCC and ground. Amplifier 212 provides a low impedance source for providing a cyclically varying signal to a rectifier circuit 82 including series capacitor 220, series diode 222, shunt diode 224, and shunt capacitor 226. The output of rectifier circuit 82 is provided on line 82 as a DC voltage which is negative with respect to signal ground. Negative voltage line 83 is provided as a supply voltage to amplifiers 172 and 190 in addition to the positive voltage supplied to these amplifiers from V+. In this manner, amplifiers 172 and 190 are capable of operating in a linear region even at small signal levels and the DC offset on output line 199 of amplifier 190 may be adjustable to zero and even a negative voltage, if desire. An additional advantage of providing a negative voltage supply to amplifiers 172 and 190 is that an internal failure of either amplifier may result in a negative voltage in output line 199 which could be interpreted by the ride control computer as an indication of a malfunctioning of the control module.

Operation

In operation, a square wave of stable frequency and amplitude is produced by square wave generator 58 on line 60, which includes a low frequency component and harmonically-related higher frequency components, and is scaled by resistors 101 and 102. The scaled square wave is converted to a low-distortion sine wave by the active-load, high frequency shunt action of sine wave shaper 62. Sine wave shaper 62 provides a low-impedance shunt for the higher frequency components and a high-impedance load to the low frequency signal component of the square wave, as well as serves to refine the shape of the resulting signal. Therefore, a low distortion, stable amplitude sine wave is produced. This sine wave signal is amplified by amplifier and driver 66 and is provided to primary winding 44 through resistor 140, capacitor 142, and filter 144.

The excitation of primary winding 44 induces a spirally looping current in tubular conductor 43. In turn, the looping current in the tubular conductor 43 causes a voltage to be induced in the secondary winding 46 that is proportional to the length of the winding assembly distal portion 36 that is telescoped within the tubular conductor 43. Thus, the tubular conductor 43 provides the transformer coupling between the primary and secondary windings. The voltage developed across secondary winding 46 is amplified by buffer amplifier 70 and rectified to a DC level, equal to the average value of the AC signal, by precision rectifier 74. The output of precision rectifier 74 is amplified and further filter by amplifier 78. The gain of the control module may be adjusted by adjusting resistor 150 and the offset of the output signal on pin 206 may be adjusted by adjusting resistor 197.

Figure 12:
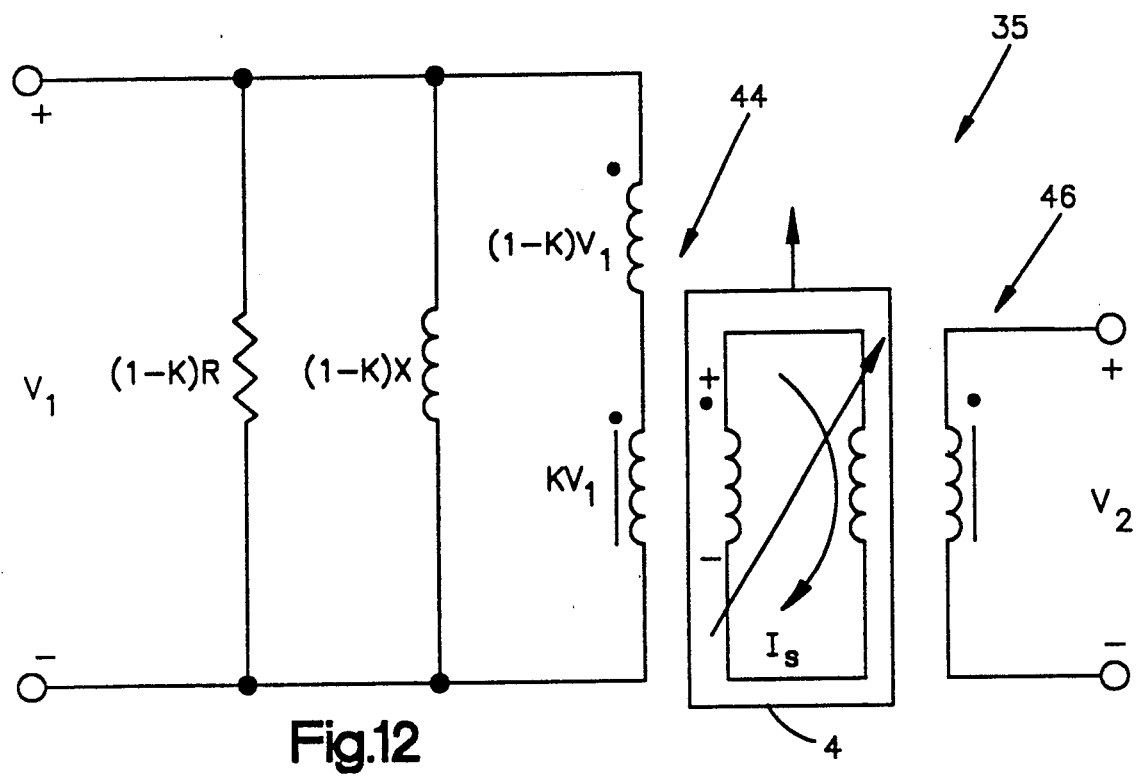
FIGS. 12 is a diagram illustrating the equivalent circuit for a position sensor according to the embodiment in FIGS. 1-11.

The effect of the tubular conductor 43 of the sensing portion 36 of the winding assembly is illustrated by reference to FIG. 12, in which:

K represents the forward voltage transfer ratio
R is the effective input resistance of the sensor
X is the effective sensor input reactance $V_1$ is the input voltage signal provided to the primary winding 44

$V_2$ is the output voltage signal developed across the secondary winding 46.

$I_s$ is the looping current induced in tubular conductor 43.

Windings 44 and 46 are long, slender coils. A current in such a coil causes a magnetic flux that is dense inside the coil and decreases with distance rapidly outside of the coil. Therefore, except for the effect of tubular conductor 43, essentially no signal $V_2$ would be developed across winding 46 in response to the excitation of winding 44 because the windings are side-by-side. As tubular portion 42 overlaps a portion of the winding assembly, the magnetic flux produced by the primary winding links the tube, which induces a looping current in the tube. This induced current produces a flux within the tube, which is opposite to and partially cancels the primary flux. If the counter-flux is, for example. 0.3 times the original flux in the primary coil, the flux within the primary coil will be at its original amplitude within the non-overlapped length, but at only 70% of its original amplitude within the overlapping portion. This will reduce both R and X, which will respond as though the overlapped portion of the primary winding were partially shorted, or removed from the circuit.

Since the same length of secondary winding 46 is within the tubular conductor 43, this portion of the secondary winding will experience, in this example, a flux that is 30% of the original flux amplitude in the primary while the non-covered portion of the secondary will experience essentially no flux. $V_2$ is directly proportional to $V_1$ times the ratio of flux in the secondary to the flux produced by the primary. The result is a voltage induced across the secondary that is proportional to the length of the winding assembly that is within the tubular portion 42.

In the preferred design illustrated in FIGS. 1—11 the coupling member is constructed from a conductive tube, preferably aluminum. The winding assembly 32 fits within the confines of the tubular conductor 43 to a greater or lesser extent depending upon the relative positioning of the wheel assembly and vehicle chassis.

In FIG. 13, an alternate design is shown wherein the winding assembly 32 is of the same construction but wherein a relatively short annular coupling member 250 surrounds a portion of the winding assembly 32 and moves in relation to the winding assembly 32 to cause a position sensitive output signal. In this short coupling design, as relative movement occurs between the coupler 250 and the winding assembly 32, the coupler overlies a constant length of the primary 44 and secondary 46 windings. In the design having a constant turn density for the primary and the secondary the output signal from the secondary would therefore remain unaffected by back and forth movement of the member 250.

Figure 24:
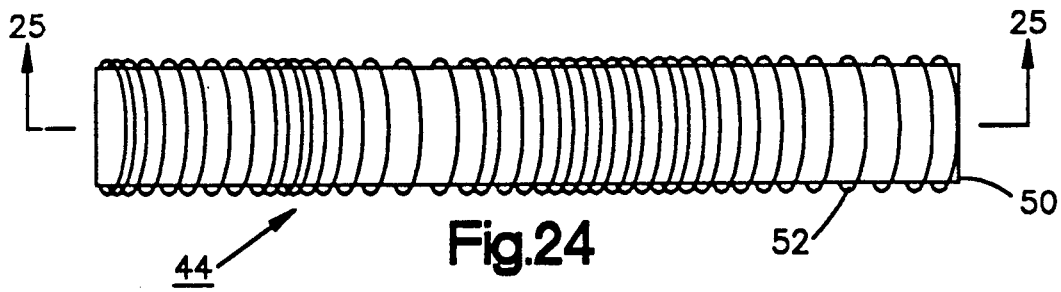
FIG. 24 is a perspective view of a transformer winding formed from a wire wrapped around a magnetically permeable core and having a controlled turn density (windings/length) along the length of the core.
Figure 25:
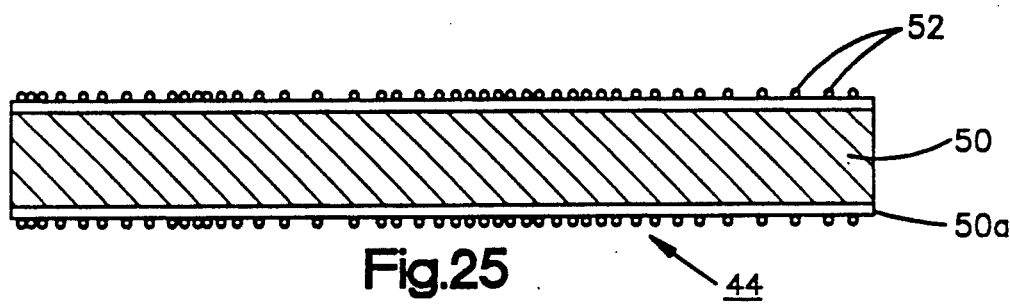
FIG. 25 is a section view as seen from the plane defined by the line 25-25 in FIG. 24.

To produce a meaningful output from the secondary 46 in response to relative movement between the coupler 250 and the winding assembly 32, a variable turn density is incorporated as the primary 44 is wound. This is depicted in FIGS. 24 and 25 wherein the turn density is adjusted. In the FIG. 24 and 25 depictions the windings 52 are also spaced from the core by an insulating sleeve 50a that is applied to or slipped over the core 50. This results in a variable flux produced by the primary along the length of the primary 44 producing a variation in the coupling between the primary and secondary coils based on the position of the coupling member 250.

Figure 21:
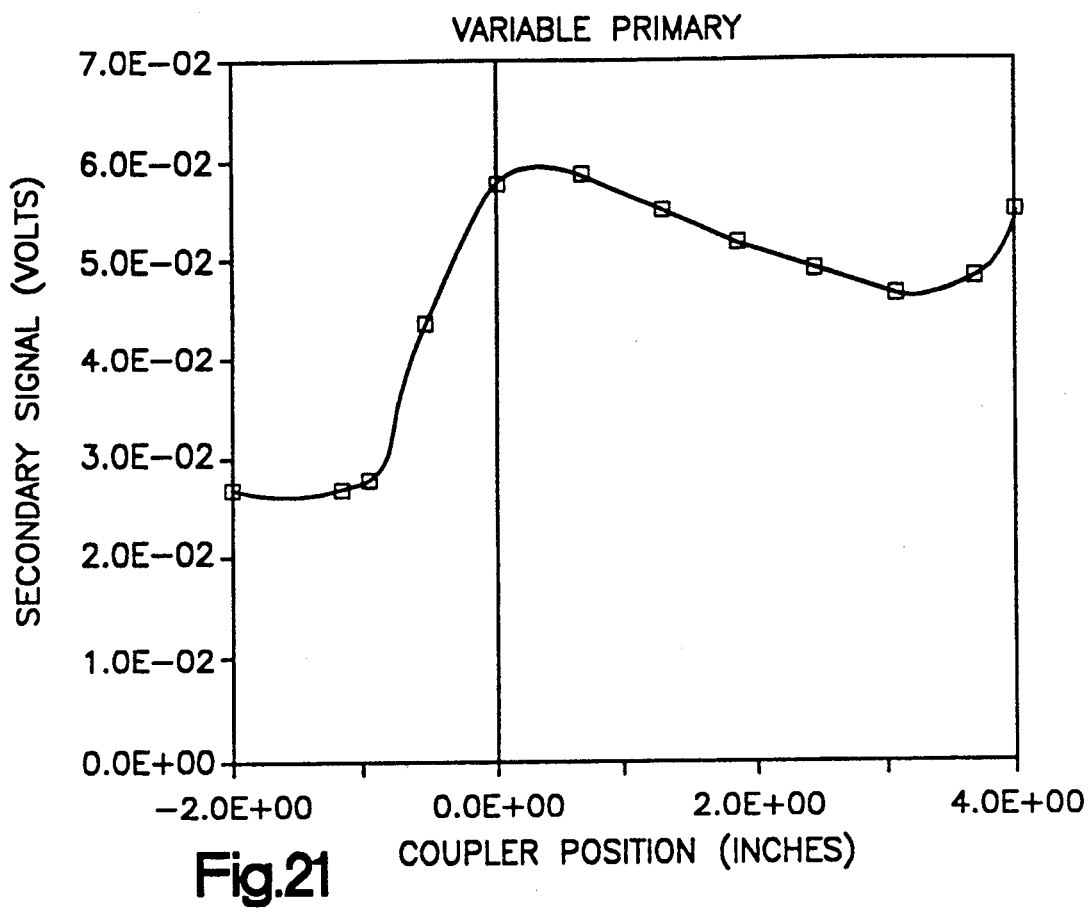
FIGS. 21 and 22 are plots of induced emf vs. coupling member position where variable turn densities are used in the primary and secondary coil windings.

By varying the turn density in accordance with a functional relation $N_p(x)$ it is possible to achieve a desired flux profile along the length of the winding assembly 32. An example of the secondary output signal produced by the arrangement depicted in FIG. 13 is seen in FIG. 21. The data in this figure was obtained by measuring the induced EMF on the coupling member 250 based upon a variable turn density in the primary 44. Since the induced EMF in the secondary is directly related to the induced EMF in the coupling member 250, a similar output from the secondary coil 46 would be expected.

Figure 22:
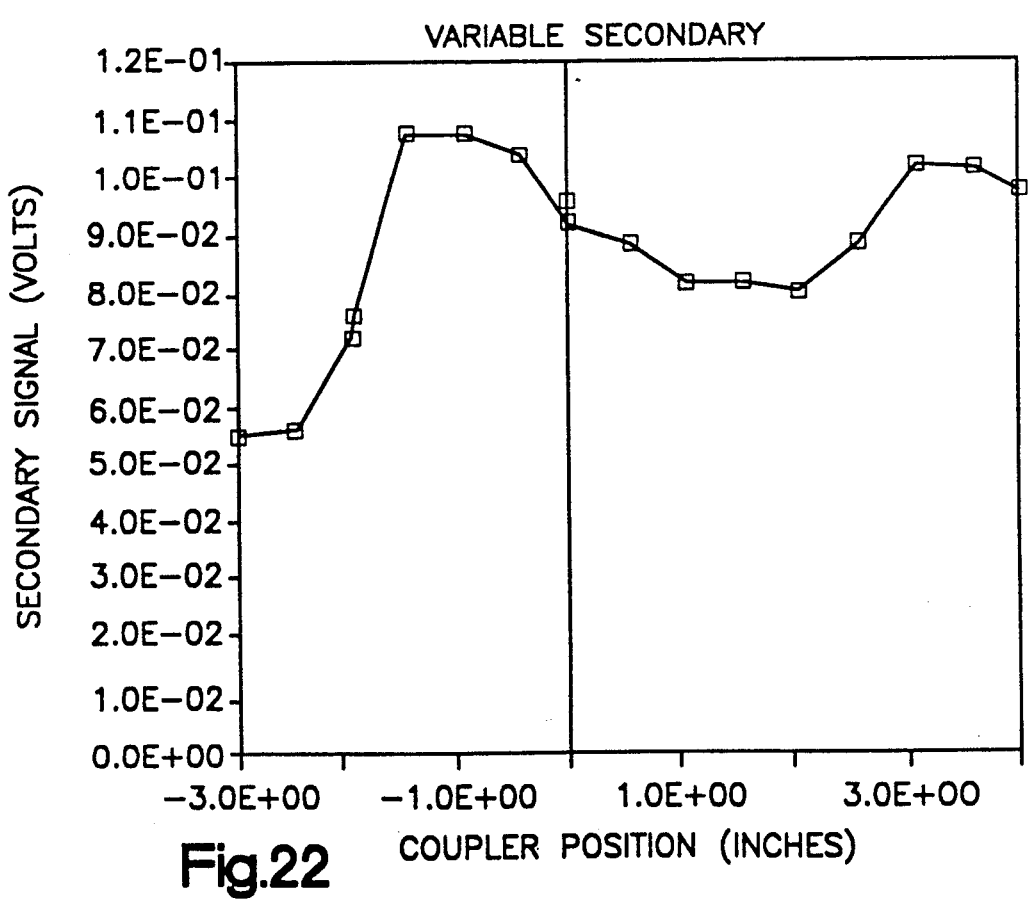

In addition to varying the turn density along the primary coil 44 it is possible that the turn density of the secondary 46 be varied. In this instance, the induced EMF in the coupling member 250 is uniform but the induced EMF in the secondary varies with turn density. FIG. 22 illustrates an example of the output from the secondary winding 46 as a function of coupler position along the length of the constant density primary 44. In this example, the length of the coupling member 250 is very much shorter than the lengths of the primary and secondary coils 44, 46. Specifically, the primary and secondary had lengths greater than 6 inches and the coupling member 250 had a length of approximately ¼ inch.

The choice of the turn density variation is not limited to the primary and secondary coils. Instead of a solid conductor, a variable turn density coil could be wound on a form and used to construct the elongated coupling member 250.

In addition, any achievable variation in turn density is possible and in particular it is possible to tailor the turn densities so that a specific critical location of the coupler member 250 with respect to the primary and secondary coils can be chosen to produce a peak output signal or alternately can be chosen to produce a rapidly changing output signal for triggering an output from suitable sensing electronics.

Figure 26:
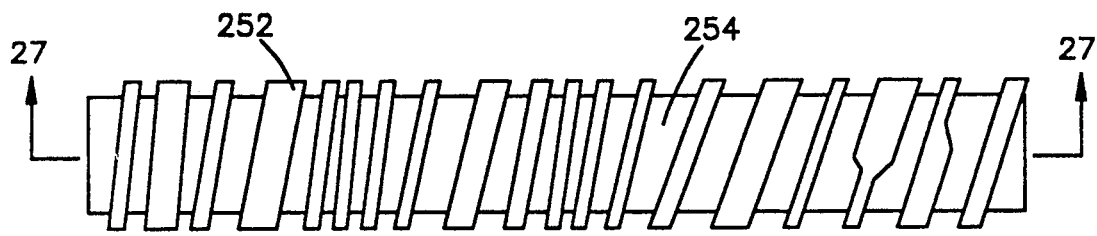
FIG. 26 is a side elevation view of a transformer winding formed from a conductive pattern that is etched or deposited in a controlled pattern around a magnetically permeable core.
Figure 27:
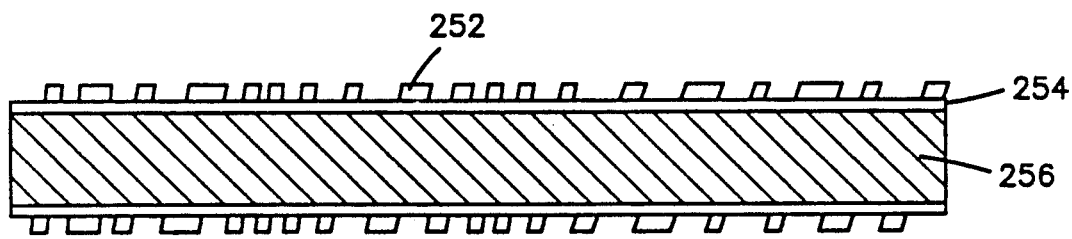
FIG. 27 is a perspective view of a coupling member having a controlled cross section along its extent for adjusting the coupling between two spaced transformer windings; and, FIG. 28 is a perspective view showing side by side elongated primary and secondary windings and an elongated coupling member having a profile that varies as a function of the position along the coupling member.

Furthermore, instead of coil windings, conductive patterns can be etched or deposited on a form for each of the primary, secondary, or coupling members. This alternative is depicted in FIGS. 26 and 27 wherein the coil 252 is etched from a conductive layer or alternatively deposited onto (using a screening technique) an insulator 254 that covers a magnetically permeable core 256.

Theoretical Model

In comparing the short and long conductive coupling members 43, 250 of FIGS. 2 and 13 the long coupling member 43 can be thought of as many of the short couplers placed colinearly. In a device of this nature the inductance of the coupler and it's effect on the primary are small with a short coupler and more pronounced in an extended one.

Each of the turns of wire on the primary creates a flux distribution along the core on which the wire is wound. This flux distribution has the following characteristics:

(A) The flux intensity due to a given turn of wire monotonically decreases in intensity as distance along the core from the turn of wire increases.

(B) The flux intensity profile along the core due to a given turn of wire is symmetric about the position of the wire except near the ends of the core. Near the ends of the core the flux distribution falls off more rapidly near and beyond the end of the core than it would 5 mm in from the end of the core.

(C) At representative currents (≦50 mA), turn densities (≦300/inch) and frequencies (around 13KHz), the lux from 1 turn of wire is independent of the flux from another. In other words a turn in a high turn density (100–300 turns/inch) region behaves the same as a turn of wire in a low density region (20–30 turns/inch). However, due to the intrinsic limits on linearity in magnetic materials (hysteresis, variable permeability) the behavior of turns of wire within high and low turn density regions cannot be identical. Note that within observed frequency-current-turn density values such variations of behavior can be neglected. However, in some cases it may be necessary to determine corrections in an iterative approach.

With these characteristics in mind a model can be constructed where each turn of wire on the primary makes a position dependent contribution to the flux linking the coupling member. The combined flux contributions from all turns of wire linking the coupling member then induce eddy currents in the coupling member which generates flux and induces a signal on the secondary. In the data depicted in FIG. 23 a 5 mm long single turn coil (conducting aluminum tube) was used in conjunction with primaries and secondaries that were divided into 1.25 mm long turn density elements. Within each density element the turn density was held constant while being allowed to vary between elements.

Figure 23:
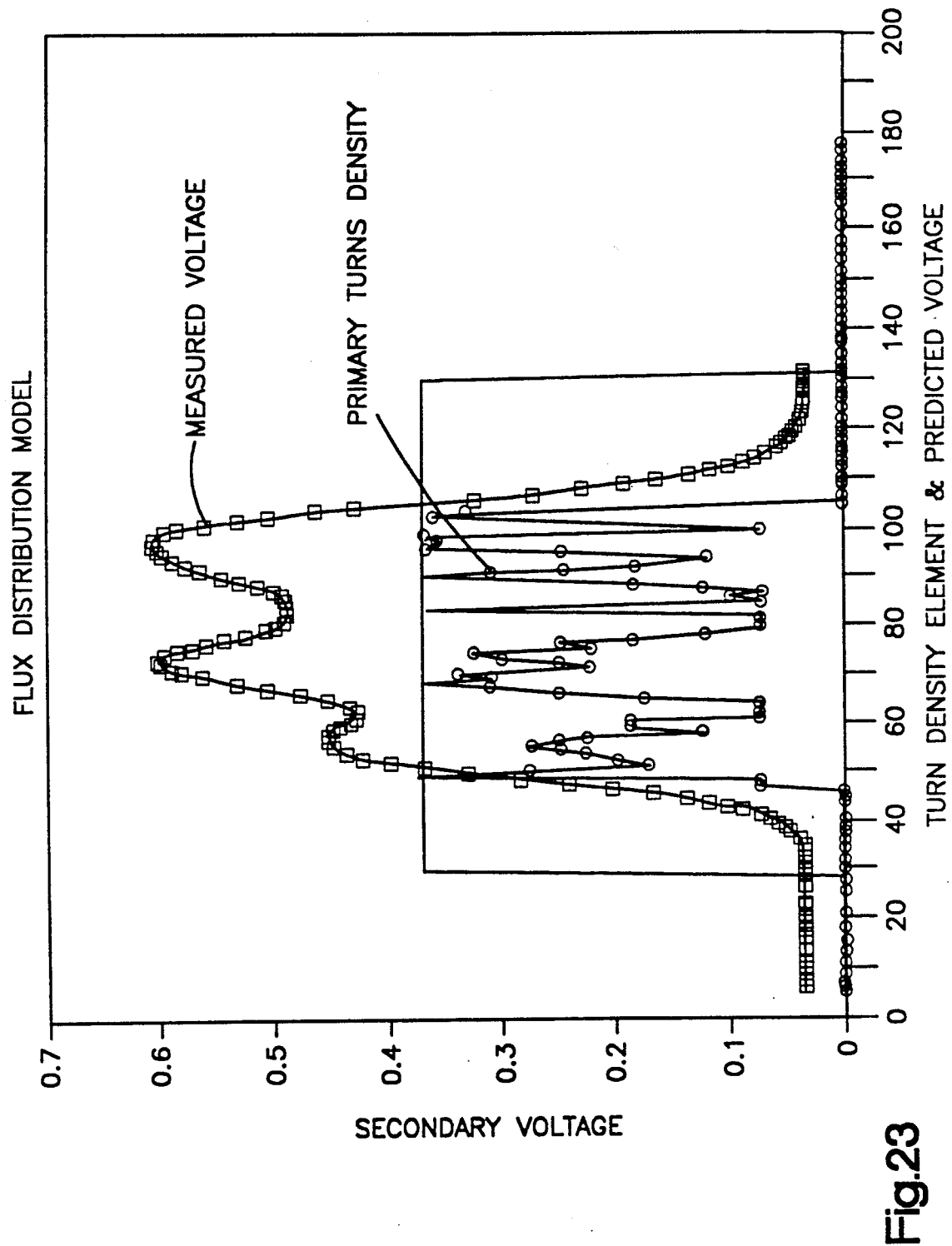
FIG. 23 is a plot showing a comparison between predicted theoretical output voltages from a position sensor with observed output voltages.

In FIG. 23 a voltage profile ("secondary voltage") is shown for a primary coupled to a secondary through a short coupling member. The coupling member was slowly moved along the length of the coils. The primary consisted of 58 turn density elements and had a total length of 72.5 mm. The secondary consisted of 104 turn density elements with a total length of 130 mm. As can be seen in the figure the turn density of the primary was rapidly varying while that of the secondary was held constant. In the region where the primary turn density is zero (i.e. the region of no overlap of primary and secondary) the secondary voltage is seen to drop dramatically. Additionally, the voltage is seen to vary more slowly than the actual turn density variation. With the constant density secondary extending > ¾" beyond the ends of the variable density primary, it was assumed that all secondary voltage variation would be due to the variation in the primary. A parametric model linking voltage to primary turn density variation was constructed as follows:

$$V_{sec_i} = I \left[ A + \sum_{n=0}^{N-1} P_n(DP_{i-n} + DP_{i+n}) \right] \quad (13)$$

where A is an additive constant representing background (non coupler induced) coupling, $P_n$ are weighting coefficients, $DP_n$ are the primary turn densities and I is the primary current. A least squares fit is applied to the data against this model and over 20 monotonically decreasing coefficients ($P_n$) are found.

A similar model is used when the secondary turn density varies and a combined model is used when both primary and secondary turn densities vary. In this combined model the flux created by the eddy currents in the coupling member extends symmetrically from the position of the coupling member (except near the ends of the cores) and links each turn of the secondary in proportion to the strength of the coupling member's flux at the position of the turn of wire. The combined model is of the form:

$$V_{sec_i} = I \left\{ O + C + \left[ \sum_{n=0}^{N-1} P_n(DP_{i-n} + DP_{i+n}) \right] \times \left[ \sum_{n=0}^{N-1} P_n(DS_{i-n} + DS_{i+n}) \right] \times G \right\} \quad (14)$$

where $P_n$, $DP_n$, and $DS_n$ are weighting coefficients, primary and secondary turn densities, C is an additive constant, and "0" and "G" vary from coil to coil. By adjusting these factors for manufacturing repeatability, this theoretical model can be used to predict secondary voltage ("$V_{sec}$") to within an offset ("0") and a gain ("G"). It is noted that the coefficients that are calculated using the least squares fitting technique vary with changes in core materials and diameters and with changes to coupler length and/or materials. Additionally, the Pn have temperature dependence resulting in $P_n \rightarrow P_n(t)$. Temperature variations become less important, however, with appropriate material choices for the cores and coupling member.

The "1st pass" error between measured and predicted voltages is under 3%. The model is "incremental" as opposed to "continuous." In a "continuous" model $P_n(t) \rightarrow P(x,t)$, $DP_n \rightarrow DP(x)$, $S_n(t) \rightarrow S(x,t)$, $DS_n \rightarrow DS(x)$, and the summations become integrals and eddy current variations along the coupler can be accounted for in an additional integration over the length of the coupler. This will allow higher accuracies in predicted versus actual secondary voltage outputs. The disclosed model is incorporated in a least squares fitting routine to predict the primary and secondary turn densities required to achieve a given "$V_{sec}$" vs. "X" response for a given use of the invention.

FIG. 14 illustrates still another alternate use of a short coupling member 250. In this example, the winding assembly 32 defines an arcuate or curved member and the coupling member 250 is mounted for movement along an arcuate path. Rather than define the position of the coupling member 250 in terms of position "x" along the length of the winding assembly 32, it is appropriate in such a configuration to consider the angular position of the coupling member 250 along the arcuate path defined by the winding assembly 32. Rather than plot coupler position in inches and secondary output in volts, it is then appropriate to refer to the coupler position in radians with respect to a reference orientation or angle.

In the preferred embodiment of the invention, the primary and secondary windings 44, 46 are wound around cylindrical cores 50, 54. The encapsulating shield 49 for the assembly 32 is also cylindrical. In FIGS. 15A–15C alternate shapes for the cores 50a, 54a, 50b 54b, and 50c, 54c are depicted. In FIG. 14A the support for the cores 50a, 54a is oval in section; in FIG. 15B it is rectangular, and in FIG. 15C the cores are arranged about an arc. The coupling members 250 used with these embodiments having inwardly facing surfaces that conform generally to the encapsulating material. This is not a requirement, however, and a rectangular coupling member could be used, for example, with the oval shaped core support in FIG. 15A.

Figure 28:
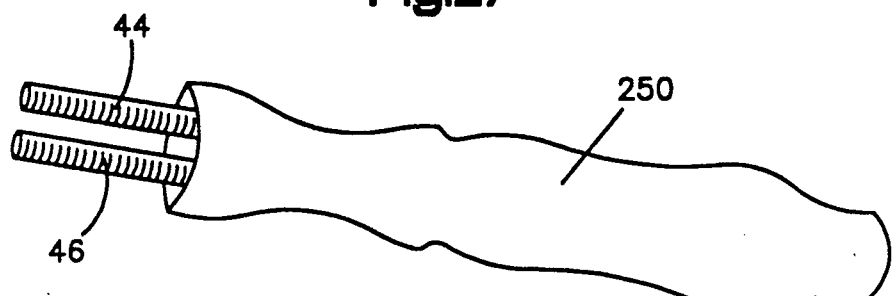

It is readily apparent that the production of a signal output that varies as a function of position can be achieved in a variety of ways. If one were to vary the diameter of the magnetically permeable cores 50, 54 along their length, for example, as shown in FIG. 15A the signal output as a function of position could be controllably adjusted. As seen in FIG. 28 the shape and/or the wall thickness of the coupling member 250 can also be varied as a function of position along the primary and secondary 44, 46. This also produces a position sensitive change in coupling between the primary and the secondary.

Alternative Coupling Embodiment

Figure 17:
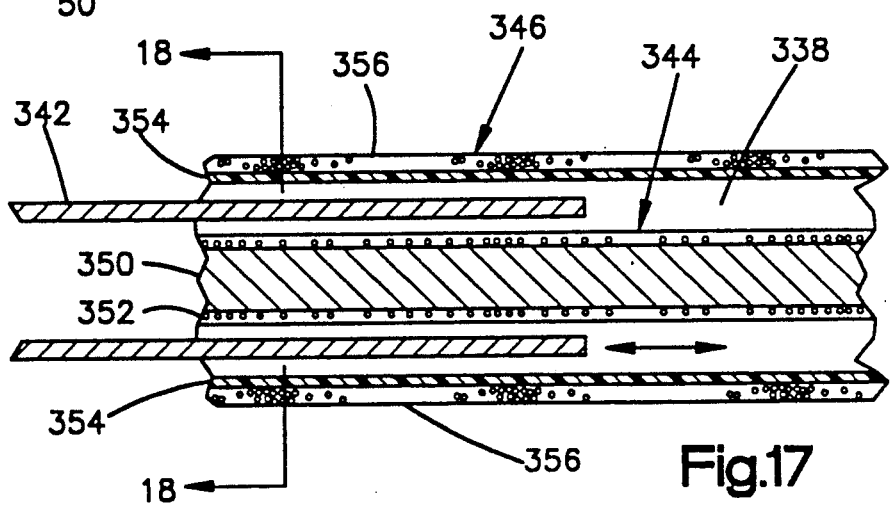
FIG. 17 is an enlarged sectional view of a short segment of the FIG. 16 embodiment.
Figure 18:
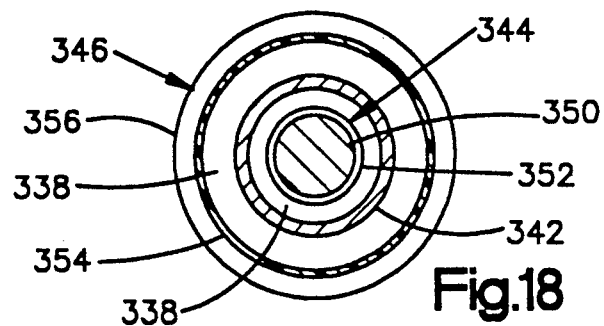
FIG. 18 is a sectional view taken along the lines 18-18 in FIG. 17.
Figure 16:
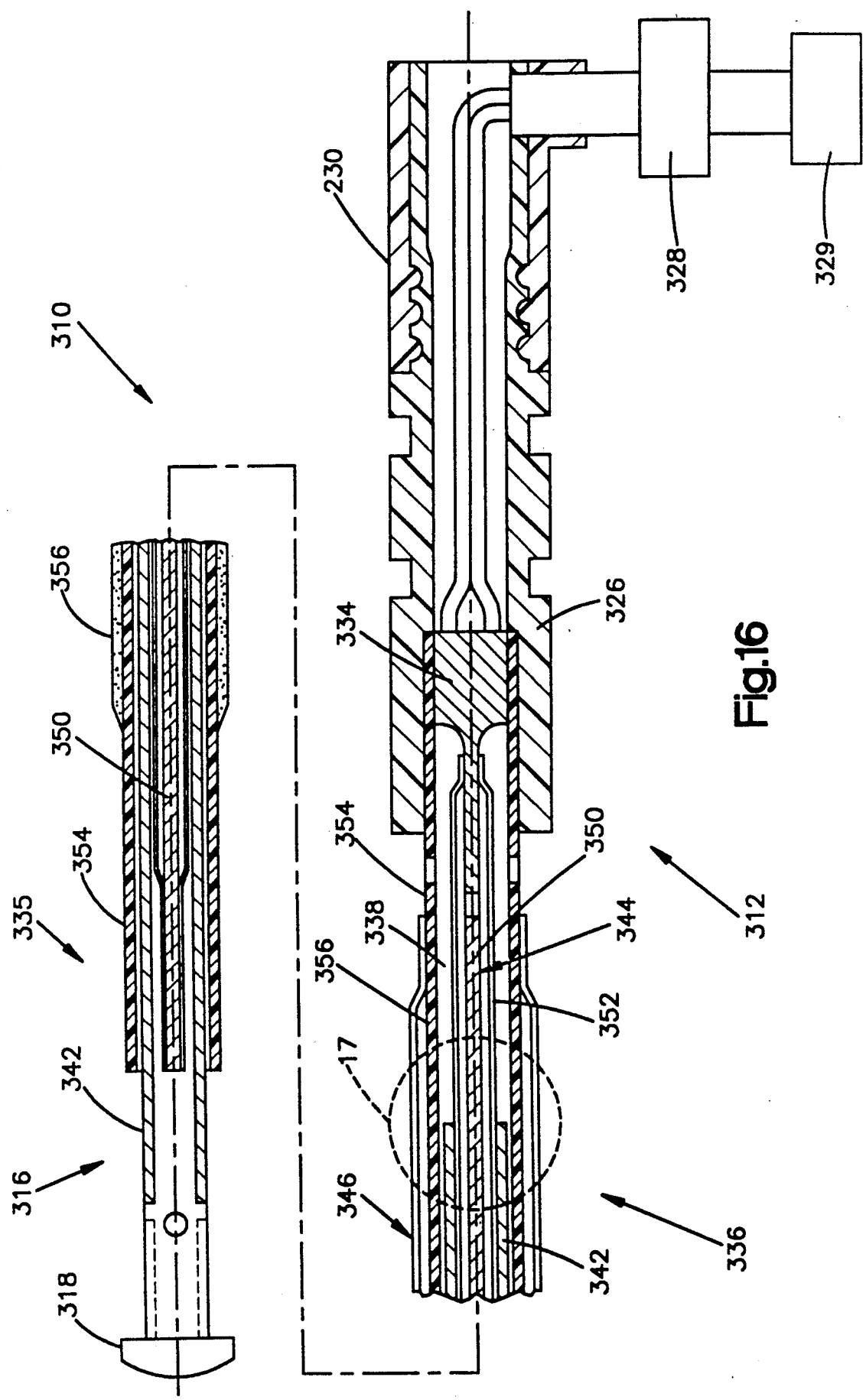
FIG. 16 is a sectional side view of a second embodiment of the invention.

In accordance with an alternate embodiment of the invention shown in FIGS. 16-18 the primary and secondary windings are positioned one within the other and separated by a cavity, or gap, and a coupling adjustment means includes a coupling disrupter member longitudinally positionable between the windings in the gap. In this embodiment, as the coupling adjustment means and the sensing probe become more telescopingly coextensive, the voltage developed across the secondary winding, as a result of the voltage applied to the primary winding, decreases because the coupling adjustment means inhibits, or reduces, the amount of transformer coupling between the windings.

In this embodiment, a non-contact linear position sensor assembly 310 includes a base portion 312 and a tracking portion 316, which are mutually longitudinally telescopingly positionable with respect to each other. Base portion 312 includes attachment means (not shown) for attachment thereof to a stationary portion of the vehicle and tracking portion 316 includes attachment means 318 for attachment to a movable portion of the vehicle, such as a wheel assembly. Base portion 312 includes a sensing portion 336 including a primary winding 344 comprising a coil 352 spirally wound around the axis of the core 350 (FIGS. 16, 17, and 18). Primary winding 344 is seen to be positioned within a secondary winding 346 which includes a core 354 having a wall defining a central bore that has an inner diameter that is substantially larger than the outer diameter of core 350. Secondary winding 346 further includes a coil 356 wound about the axis of the core 354. The dimensions of the primary and secondary windings are selected in order to define a cavity or gap 338 between the primary and secondary windings. A tubular portion 342 of tracking portion 316 is longitudinally positionable within the gap 338. Tubular portion 342 and sensing portion 336 define a sensing probe 335.

Core 350 includes an enlarged end portion 334 which is sized to frictionally engage core 354 which, in turn, is sized to frictionally engage a frame member 326 included in base portion 312 (FIG. 16). Position sensor 310 further includes a stress relief member 230 which engages frame 326 and supports a plurality of electrical leads extending to a control module 328 which, in turn, is connected by an electrical connector 329 to the ride control computer (not shown).

Core 350 is made from a ferromagnetic material, such as iron, and the secondary core 354 is made from a non-magnetic material, such as a structural polymer. As best seen in FIG. 16, the primary and secondary coils do not extend the entire length of their respective cores. Rather, the coils are positioned on their respective cores in a manner that will provide interface between the coupling means and the coils over the entire extent of travel of tubular portion 342, plus an additional length of the core equal to approximately 10 percent of the inner primary coil and 5 percent of the outer secondary coil. Primary and secondary windings are each spirally wound around their respective cores from a single length of wire and are each covered by a protective film such as a Mylar sleeve or other insulating material.

Figure 20:
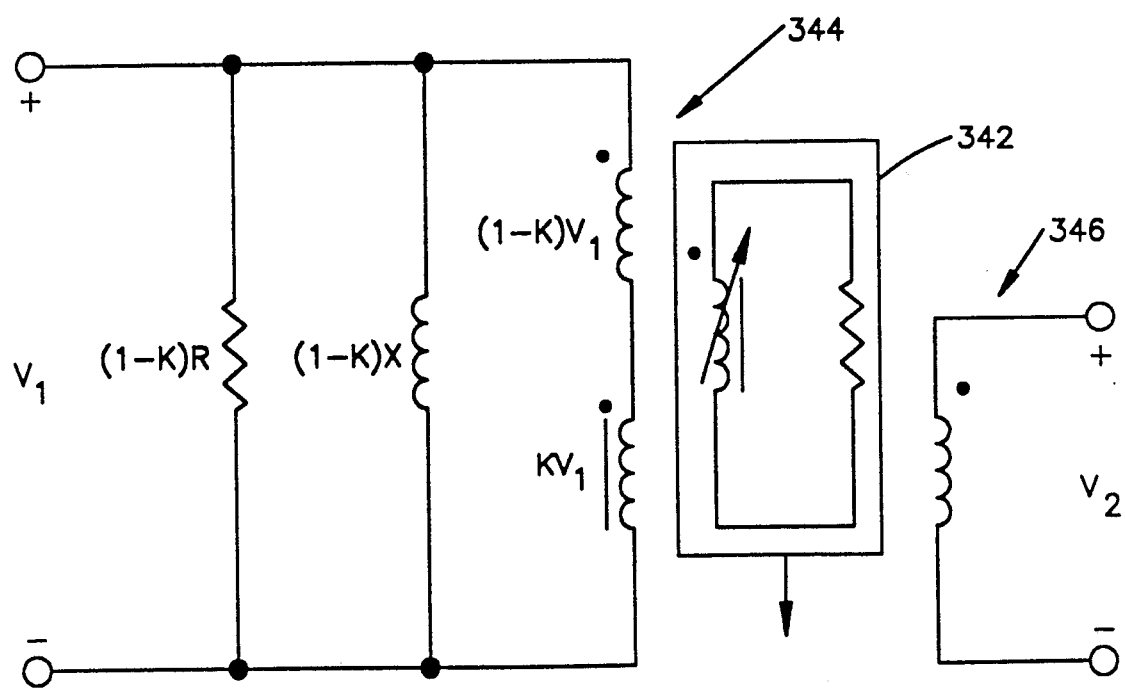
FIG. 20 is a diagram illustrating the equivalent circuit for a sensor probe according to the embodiment in FIGS. 16-18.

Because primary winding 344 is positioned within secondary units 346, excitation of the primary winding by a voltage $V_1$ induces a voltage $V_2$ in the secondary winding (FIG. 20). The coupling adjustment member in this embodiment, which is defined by tubular portion 342, operates as a magnetic shield which interrupts this transformer coupling between primary winding 344 and secondary winding 346. Tubular portion 342 creates a variable reluctance path for the magnetic flux. This variable reluctance path proportionately decreases the amount of current induced into the secondary winding. The flux available for inducing a voltage in the secondary winding is proportional to the length of gap 338 in which the tubular portion 342 is absent. Accordingly, as tubular portion 342 is additionally telescopingly extended within gap 338, the magnetic shielding effect of the tubular portion reduces the magnetic coupling between the windings, which reduces the voltage developed across the secondary winding from the signal applied to the primary winding. Therefore, the output signal from the sensing probe responds to the relative positioning of the position sensor portions in the opposite manner to that described in the embodiment illustrated in FIGS. 1—10. In the illustrated embodiment, tubular portion 342 is made from a magnetic metal such as iron. However, nonferrous and even nonmagnetic materials can be used so long as the tubing has an effect on the transformer coupling.

Figure 19:
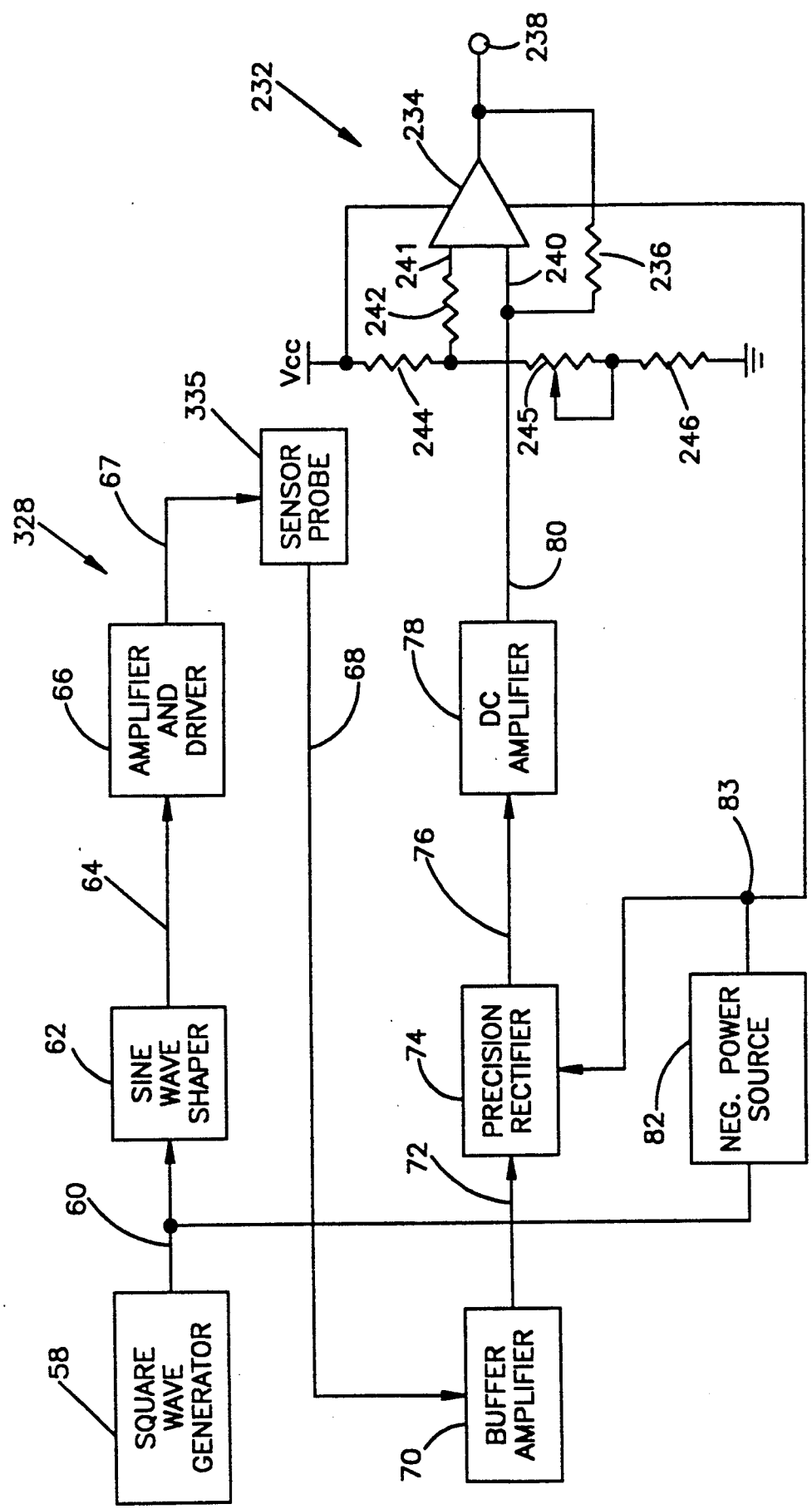
FIG. 19 is an electrical circuit diagram partially in block form and partially in schematic form of the control module of the embodiment illustrated in FIGS. 16-18.

The control module 328, provided with this embodiment, as illustrated in FIG. 11, is essentially the same as that disclosed in FIGS. 4 and 5, with the addition of an inverting amplifier 232 connected with the output 80 of DC amplifier 78. Inverting amplifier 232 includes an operational amplifier 234 having a feedback resistor 236 extending between an output 238 of the amplifier and an inverting input 240, in order to establish its gain. The non-inverting input 241 of amplifier 232 is provided with a constant voltage level through a voltage divider, comprising resistors 244, 245, and 246 series connected between VCC and ground, and a series resistor 242. In the embodiment illustrated in FIG. 11, resistor 245 is adjustable. Amplifier 234 is supplied with both a positive voltage V+ and a negative voltage, the latter from line 83. The operation of the control module illustrated in FIG. 19 is essentially the same as that illustrated in FIGS. 10 and 11. However, the output 80 of amplifier 78 is further amplified and inverted due to the inclusion of an additional output stage including inverting amplifier 234.

Representative values of various components in the illustrated embodiment of the circuit of FIGS. 10 and 11 are as follows:

| Reference Number | Value |
|---|---|
| Resistor 101 | 15K, 1% |
| Resistor 102 | 5.11K, 1% |
| Resistor 112 | 110K |
| Resistor 114 | 24K |
| Capacitors 118, 124 | 0.0022 uf, NPO type |
| Resistor 122 | 10K, 1% |
| Resistor 139 | 10K |
| Resistor 140 | 180 |
| Capacitor 142 | 4.7 uf |

-continued

| Reference Number | Value |
| --- | --- |
| Capacitor 146 | 0.1 uf |
| Capacitor 148 | 0.001 uf |
| Resistor 160 | 180K |
| Resistor 162 | 100K |
| Resistor 164 | 274K, 1% |
| Capacitor 166 | 10 pf, NPO type |
| Capacitor 170 | 0.1 uf |
| Resistor 175 | 1K |
| Resistor 178 | 1K, 1% |
| Resistor 186 | 10K, 1% |
| Resistor 188 | 2.1K, 1% |
| Resistor 194 | 47.5K, 1% |
| Resistor 195 | 237 |
| Resistor 196 | 2.1K, 1% |
| Resistor 198 | 200, 1% |
| Resistor 200 | 274K, 1% |
| Capacitor 202 | 680 pf |
| Capacitor 209 | 1 uf |
| Capacitor 210 | 0.001 uf |

CONCLUSION

The present invention is readily adaptable to low cost automated assembly. The windings may be spirally positioned on the respective cores merely by rotating of the cores while applying the wire turns by a numerically controlled apparatus. The output characteristics of the sensor assembly, with respect to the relative positioning of the sensor probe portions, may be adjusted by selectively adjusting the turn-spacing of the coils along various portions of the respective cores as shown in FIGS. 21 and 22. This versatility allows the position sensor to be "tuned" to the characteristics of a particular vehicle's suspension system. The ability to combine the packaging of the sensing probe and electronic module allows adjustment to the electronic circuitry, such as gain and offset, to be made at the factory before the components are encapsulated. Thereafter, the position sensor assembly may be easily positioned on the vehicle and connected to the ride control computer without additional adjustment in the field. The structure of the various components additionally reduces weight and bulk and enhances the durability of the assembly. The unique aspects of the control module according to the invention provides a reduced component count which further improves the compactness of the assembly and, along with the superior temperature stability of the circuit, allows an entire sensor probe to be positioned within a harsh environment. Furthermore, the components of the sensor probe can be adapted for a lubricous sliding interfit provided by a hydraulic fluid of a shock absorber in which the sensor can be located with no effect on sensor performance.

A linear position sensor assembly according to the invention may be made responsive over 90 percent of the stroke length of the tracking portion with respect to the base portion. Thus, space occupied by the assembly is substantially reduced. In addition to positioning within a shock absorber, the invention may be adapted to mounting external to a shock absorber parallel to the direction of its travel. The invention may additionally find application in sensing the position of portions of an automotive vehicle other than the suspension system and may be applied to non-vehicular uses such as use with machine tools and the like.

Other changes and modifications in the specifically described embodiments can be carried out without departing from the principles of the invention which is intended to be limited only by the spirit or scope of the appended claims.

We claim:

1. Position sensing apparatus for monitoring a relative position between two relatively moveable members comprising:
    (a) an elongated field producing member coupled to a first of said moveable members and including a first multiturn conductor wound about a field producing member axis having a first controlled turn density, and an input for energizing the first multiturn conductor to produce an electromagnetic field in the vicinity of the field producing member;
    (b) an elongated field responsive member fixed with respect to the field producing member including a second multiturn conductor wound about a field responsive member axis having a second controlled turn density, said elongated field responsive member oriented in side by side, generally parallel orientation to the elongated field producing member along a length of the field producing member, and having an output for providing an output signal in response to the electromagnetic field produced by the field producing member;
    (c) a coupling member connected to a second of the moveable members for movement with the second moveable member and positioned relative the field producing and field responsive members to alter the response of the field responsive member as the moveable members move relative to each other and thereby change the signal at the output of the field responsive member;
    (d) exciter means coupled to the input for energizing the field producing member; and
    (e) circuit means coupled to the output from the field responsive member to correlate changes in the output signal with relative movement of the moveable members. multiturn conductor to produce an electromagnetic field in the vicinity of the field producing member;
    (b) an elongated field responsive member fixed with respect to the field producing member including a second multiturn conductor wound about a field responsive member axis having a second controlled turn density, said elongated field responsive member oriented in side by side, generally parallel orientation to the elongated field producing member along a length of the field producing member, and having an output for providing an output signal in response to the electromagnetic field produced by the field producing member;
    (c) a coupling member connected to a second of the moveable members for movement with the second moveable member and positioned relative the field producing and field responsive members to alter the response of the field responsive member as the moveable members move relative to each other and thereby change the signal at the output of the field responsive member;
    (d) exciter means coupled to the input for energizing the field producing member; and
    (e) circuit means coupled to the output from the field responsive member to correlate changes in the output signal with relative movement of the moveable member.

2. The apparatus of claim 1, wherein the multiturn conductors are deposited onto a magnetically permeable form.

3. The apparatus of claim 1 wherein the field producing and field responsive members are etched from a conductive layer supported by a magnetically permeable form.

4. The apparatus of claim 1 wherein the coupling means comprises an electrically conductive material.

5. The apparatus of claim 4 wherein the coupling means comprises a multi-turn coil arranged spirally around a form having a controlled turn density to form an elongated member.

6. The apparatus of claim 1 wherein the coupling means comprises a magnetically permeable material.

7. The apparatus of claim 1 wherein both the field producing and field responsive- members are elongated linear or curvilinear members disposed side by side in a direction generally parallel to a travel path followed by the moveable member.

8. The apparatus of claim 1 wherein the coupling member has a short length relative the length of the field producing and field responsive members.

9. The apparatus of claim 1 wherein the coupling member is an annular conductor having a length shorter than the elongated linear members and connected to the moveable member for movement along a travel path parallel to the elongated linear members in overlapping relation.

10. A method of monitoring first and second relatively moveable members comprising the steps of:
(a) winding elongated conductors to form primary and secondary transformer windings having controlled turn densities along a length of primary and secondary axes that are relatively spaced from each other and connecting the primary and secondary transformer windings to a first of the relatively moveable members;
(b) supporting a transformer coupling member for movement along a tracking path that parallels the primary and secondary axes by connecting said coupling member to the second relatively moveable member;
(c) energizing the transformer primary winding with an external energy source; and
(d) monitoring an output from the secondary winding as the first and second relatively moveable members move in relation to each other; and
(e) correlating an output signal from the secondary winding with a relative position of said first and second relatively moveable members.

11. The method of claim 10 wherein the primary and/or secondary turn density is controlled to produce a specified amplitude versus position signal output.

12. The method of claim 10 wherein the coupling member has a relatively short extent compared to the primary and secondary transform windings.

13. The method of claim 10 where the primary and secondary transformer conductor turns are arranged with a controlled non-uniform density around a magnetically permeable core.

14. The method of claim 10 where the primary and secondary transformer conductor turns are arranged with a controlled turn density around a variable cross section magnetically permeable core.

15. The method of claim 10 where the windings are deposited or etched in a controlled pattern around a magnetically permeable core.

16. The method of claim 10 where the coupling member comprises a passageway defining member having a controlled shape or wall thickness along its length.

17. A position sensor, comprising:
(a) a primary winding having a first core and a conductor wound around said first core including a multiplicity of turns spaced along at least a portion of a length of said first core;
(b) a secondary winding having a second core and a second conductor wound around said second core including a multiplicity of turns spaced along at least a portion of a length of said second core;
(c) said secondary winding positioned adjacent said primary winding, in a spaced, transformer coupling relationship with the first and second cores in side by side, non-coaxial relation and attached to a first of two relatively positioned members; and
(d) coupling means moveable with a second of said two relatively positioned members to overlie at lest one of the primary and secondary windings and vary the transformer coupling between said windings as the two relatively positioned members move with respect to each other.

18. The position sensor of claim 17, wherein said primary and secondary windings are coextensive and substantially parallel.

19. The position sensor of claim 18, wherein said coupling means comprises a tubular member sized to receive said primary and secondary windings and moveable relative to said windings.

20. The apparatus of claim 18, wherein said tubular member has an axial extent less than a longitudinally extent of said primary and said secondary windings.

21. The position sensor of claim 18, wherein said tubular member has an axial extent sized to receive a substantial portion of said primary and secondary windings.

22. A sensor apparatus for monitoring a position of a wheel assembly member relative to a vehicle chassis portion, comprising:
(a) an elongated field producing member having a conductive coil wound about a field producing axis and an input for energizing the coil to produce an electromagnetic field in the vicinity of the field producing member;
(b) an elongated field responsive member fixed with respect to the field producing member having a conductive coil wound about a field responsive axis oriented generally parallel and spaced from the field producing axis along a length of the field producing member, and having an output for providing an output signal in response to the electromagnetic field produced by the field producing member, said field producing and field responsive members connected to said chassis portion;
(c) a coupling member connected to the wheel assembly member for movement with the wheel assembly member and positioned relative to the field producing and field responsive members to alter the response of the field responsive member as the wheel assembly member moves and thereby change the signal at the output of the field responsive member;
(d) exciter means coupled to the input for energizing the field producing member; and
(e) circuit means coupled to the output from the field responsive member to correlate changes in the output signal with movement of the wheel assembly member.

23. A sensor apparatus for monitoring a position of a wheel assembly member relative to a vehicle chassis portion, comprising:
(a) an elongated field producing member having a conductive coil wound about a field producing axis and an input for energizing the coil to produce an electromagnetic field in the vicinity of the field producing member;
(b) an elongated field responsive member fixed with respect to the field producing member having a conductive coil wound about a field responsive axis oriented generally parallel and spaced from the field producing axis along a length of the field producing member, and having an output for providing an output signal in response to the electromagnetic field produced by the field producing member, said field producing and field responsive members connected to said wheel assembly member;
(c) a coupling member connected to the chassis portion for movement with the chassis portion and positioned relative the field producing and field responsive members to alter the response of the field responsive member as the wheel assembly member moves and thereby change the signal at the output of the field responsive member;
(d) exciter means coupled to the input for energizing the field producing member; and
(e) circuit means coupled to the output from the field responsive member to correlate changes in the output signal with movement of the wheel assembly member.

24. The position sensing apparatus of claim 1 wherein the coupling member comprises a passageway defining member having a controlled shape or wall thickness along its length.

25. THe position sensor of claim 17 wherein the coupling means comprises a passageway defining member having a controlled shape or wall thickness along its length to uniquely define a secondary response as the relative position of the coupling means with respect to the primary and secondary change.

26. A method of monitoring first and second relatively moveable members comprising the steps of:
(a) winding first and second elongated conductors to form primary and secondary transformer windings having controlled turn densities along a length of primary and secondary axes and connecting the primary and secondary transformer windings to a first of the relatively moveable members;
(b) supporting a transformer coupling member for movement along a tracking path that parallels the primary and secondary axes by connecting said coupling member to the second relatively moveable member;
(c) energizing the transformer primary winding with an external energy source; and
(d) monitoring an output from the secondary winding as the first and second relatively moveable members move in relation to each other; and
(e) correlating an output signal from the secondary winding with a relative position of said first and second relatively moveable members;
(f) said winding step performed by varying the turn density of the windings of both the primary and the secondary windings to provide an output signal from the secondary winding that is functionally dependent on the relative position of the first and second moveable members.

27. A position sensor, comprising:
(a) a primary winding having a first core and a conductor wound around said first core including a multiplicity of turns spaced along at least a portion of a length of said first core;
(b) a secondary winding having a second core and a second conductor wound around said second core including a multiplicity of turns spaced along at least a portion of a length of said second core;
(c) said secondary winding positioned in a spaced, generally co-axial transformer coupling relationship with the primary winding with both said primary and secondary windings attached to a first of two relatively positioned members; and
(d) coupling means moveable with a second of said two relatively positioned members to overlie at least one of the primary and secondary windings and vary the transformer coupling between said windings as the two relatively positioned members move with respect to each other;
(e) said primary and secondary windings having controlled turn densities along both their lengths to provide an output signal from the secondary winding that is functionally dependent on the relative position of the two relatively positioned members.

* * * * *